(12) United States Patent
Oh

(10) Patent No.: US 12,294,208 B2
(45) Date of Patent: *May 6, 2025

(54) SUPPORT SYSTEM FOR ELECTRICAL BOXES

(71) Applicant: ERICO International Corporation, Solon, OH (US)

(72) Inventor: Michael Hung-Sun Oh, Twinsburg, OH (US)

(73) Assignee: ERICO International Corporation, Solon, OH (US)

( * ) Notice: Subject to any disclaimer, the term of this patent is extended or adjusted under 35 U.S.C. 154(b) by 154 days.

This patent is subject to a terminal disclaimer.

(21) Appl. No.: 17/704,525

(22) Filed: Mar. 25, 2022

(65) Prior Publication Data
US 2022/0216679 A1 Jul. 7, 2022

Related U.S. Application Data

(63) Continuation of application No. 16/529,426, filed on Aug. 1, 2019, now Pat. No. 11,296,489.

(60) Provisional application No. 62/797,083, filed on Jan. 25, 2019, provisional application No. 62/713,339, filed on Aug. 1, 2018.

(51) Int. Cl.
*H02G 3/12* (2006.01)

(52) U.S. Cl.
CPC ..................... *H02G 3/12* (2013.01)

(58) Field of Classification Search
CPC .......... H02G 3/081; H02G 3/12; H02G 3/121; H02G 3/123; H02G 3/125; H02G 3/126; Y10T 403/7043; Y10S 248/906
See application file for complete search history.

(56) References Cited

U.S. PATENT DOCUMENTS

| 2,963,127 | A | 12/1960 | Dewey |
| 3,233,297 | A | 2/1966 | Havener |
| 4,362,284 | A | 12/1982 | Bolante |
| 4,483,453 | A | 11/1984 | Smolik |
| 4,775,121 | A | 10/1988 | Carty |
| 4,971,280 | A | 11/1990 | Rinderer |
| 5,141,185 | A | 8/1992 | Rumbold et al. |
| 5,319,837 | A | 6/1994 | Kujawski |
| 5,354,953 | A | 10/1994 | Nattel et al. |

(Continued)

FOREIGN PATENT DOCUMENTS

EP 1104065 A 5/2001

*Primary Examiner* — Jonathan Liu
*Assistant Examiner* — Guang H Guan
(74) *Attorney, Agent, or Firm* — Quarles & Brady LLP

(57) ABSTRACT

A mounting system for a first support and a second support for electrical components can include a first mounting interface and a second mounting interface. The first mounting interface can include a first channel, and a first insertion slot extending from inside of the first channel to outside of the first channel. The second mounting interface can include a second channel and a first interface arm, and a second interface arm. The second channel can be configured to nest within the first channel. The first interface arm can extend through the first insertion slot when the second channel is nested within the first channel. The second interface arm can be spaced laterally from the second channel and can engage an outside surface of the first channel when the second channel is nested within the first channel.

18 Claims, 31 Drawing Sheets

(56) References Cited

U.S. PATENT DOCUMENTS

| | | | |
|---|---|---|---|
| 5,971,329 | A | 10/1999 | Hickey |
| 6,996,943 | B2 | 2/2006 | Denier et al. |
| 7,014,152 | B2 | 3/2006 | Grendahl |
| 7,053,300 | B2 | 5/2006 | Denier et al. |
| 7,073,757 | B2 | 7/2006 | Johnson et al. |
| 7,271,335 | B2 | 9/2007 | Dinh |
| 7,271,336 | B2 | 9/2007 | Dinh |
| 8,240,619 | B2 | 8/2012 | Nikayin |
| 8,371,540 | B1 | 2/2013 | Medlin, Jr. |
| 8,387,927 | B1 | 3/2013 | Medlin, Jr. |
| 8,403,277 | B2 | 3/2013 | Nuernberger et al. |
| 8,403,289 | B1 | 3/2013 | Rinderer |
| 8,424,827 | B2 | 4/2013 | Dinh |
| 8,496,211 | B2 | 7/2013 | Rinderer |
| 8,746,633 | B1 | 6/2014 | Medlin, Jr. |
| 9,136,681 | B1 | 9/2015 | Medlin, Jr. |
| 9,553,432 | B2 | 1/2017 | Korcz et al. |
| 9,653,899 | B2 | 5/2017 | Salian et al. |
| 9,825,446 | B2 | 11/2017 | Korcz et al. |
| 9,935,439 | B2 | 4/2018 | Witherbee et al. |
| 10,135,232 | B2 | 11/2018 | Nikayin et al. |
| 10,256,613 | B2 | 4/2019 | Korcz et al. |
| 11,296,489 | B2 * | 4/2022 | Oh ................... H02G 3/081 |
| 11,473,721 | B2 * | 10/2022 | Oh ................... F16M 13/022 |
| 2010/0089640 | A1 | 4/2010 | Dilillo et al. |
| 2011/0001026 | A1 | 1/2011 | Kubsad et al. |
| 2012/0024596 | A1 | 2/2012 | Dilillo et al. |
| 2016/0099555 | A1 | 4/2016 | Nikayin et al. |
| 2020/0044426 | A1 | 2/2020 | Oh |
| 2020/0240549 | A1 | 7/2020 | Oh |
| 2022/0271521 | A1 * | 8/2022 | Oh ................... H02G 3/081 |

\* cited by examiner

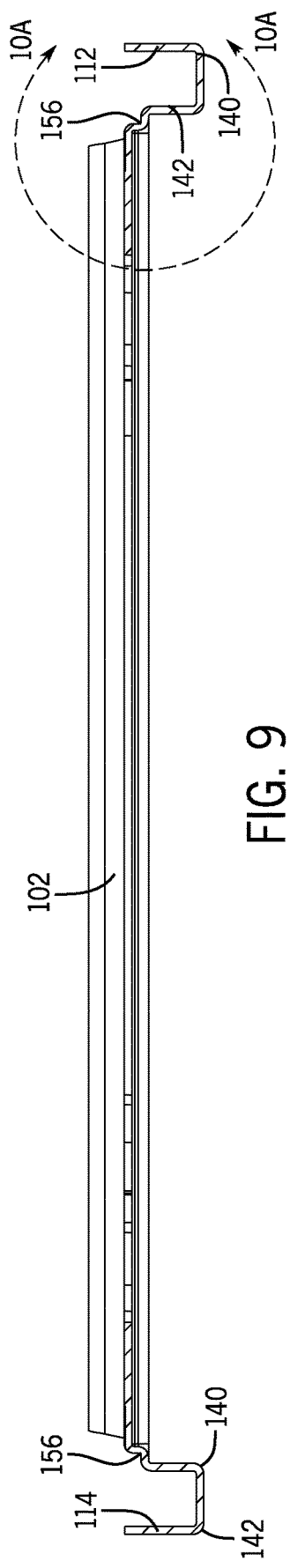
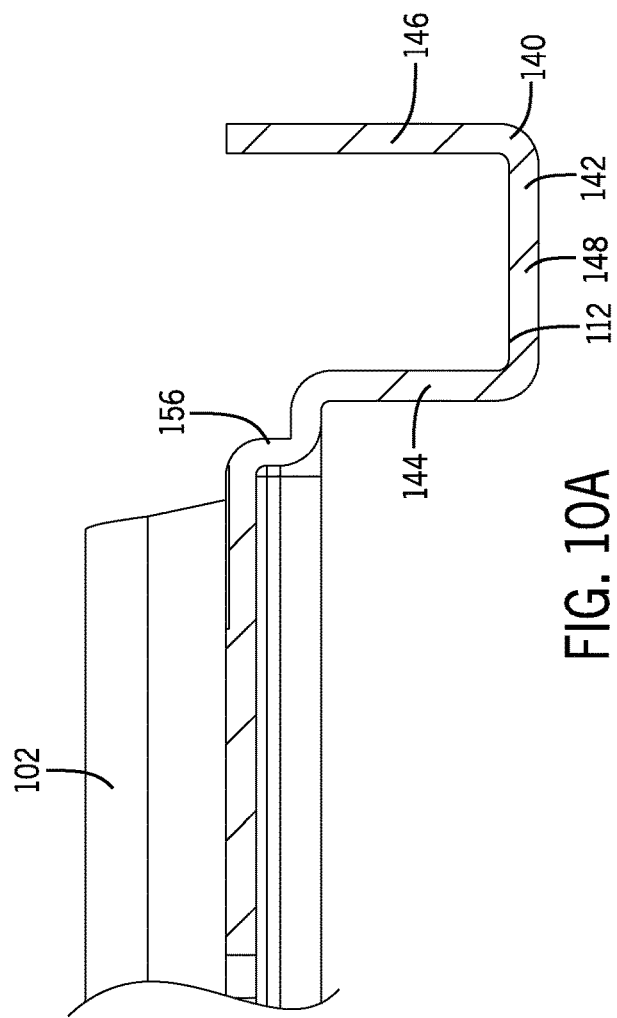
FIG. 9
FIG. 10A

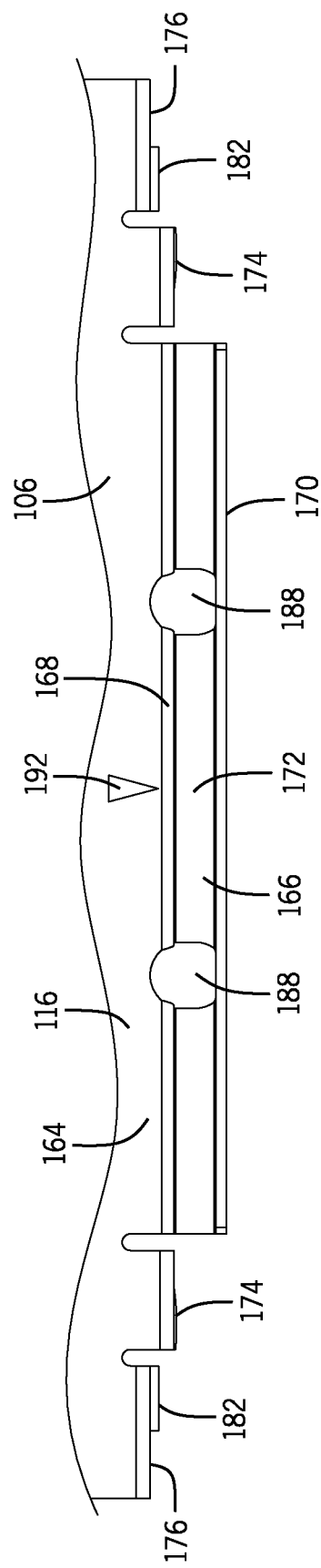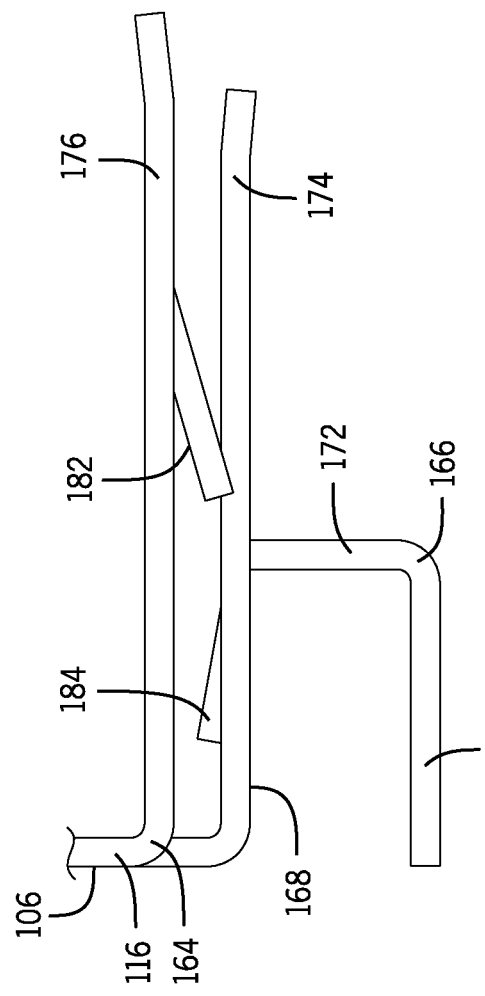

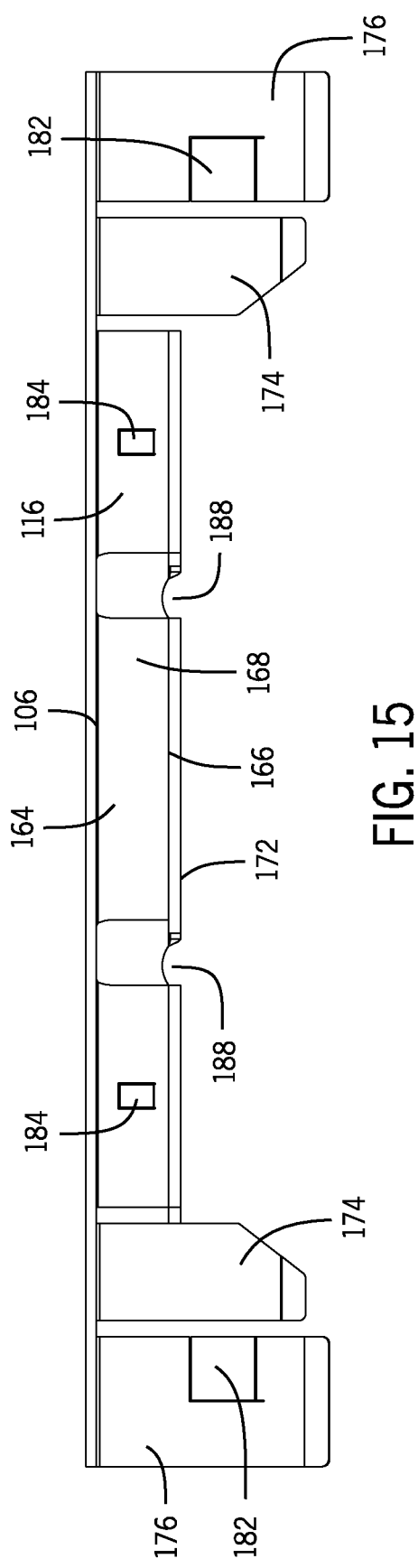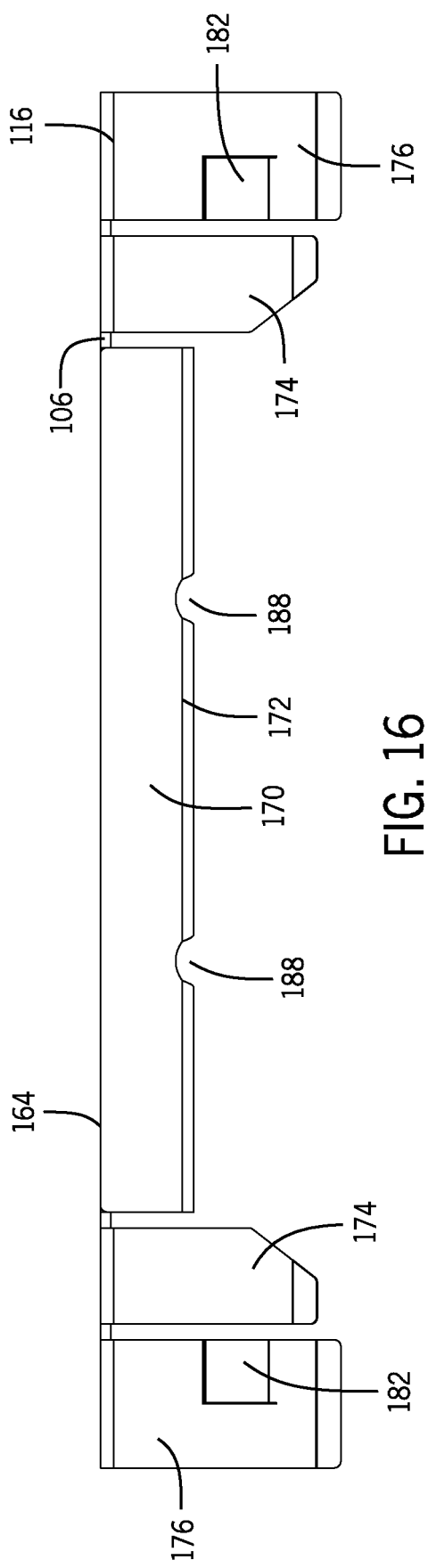

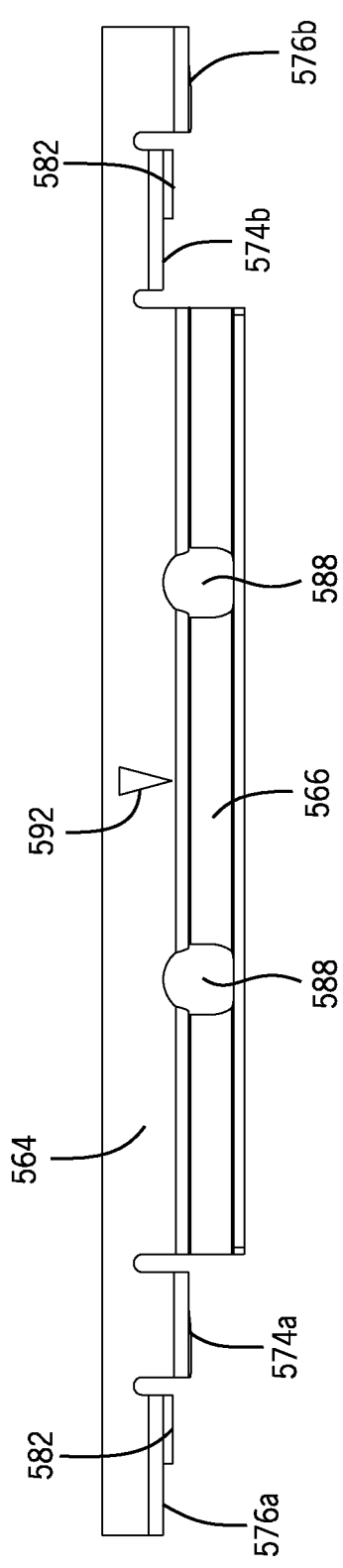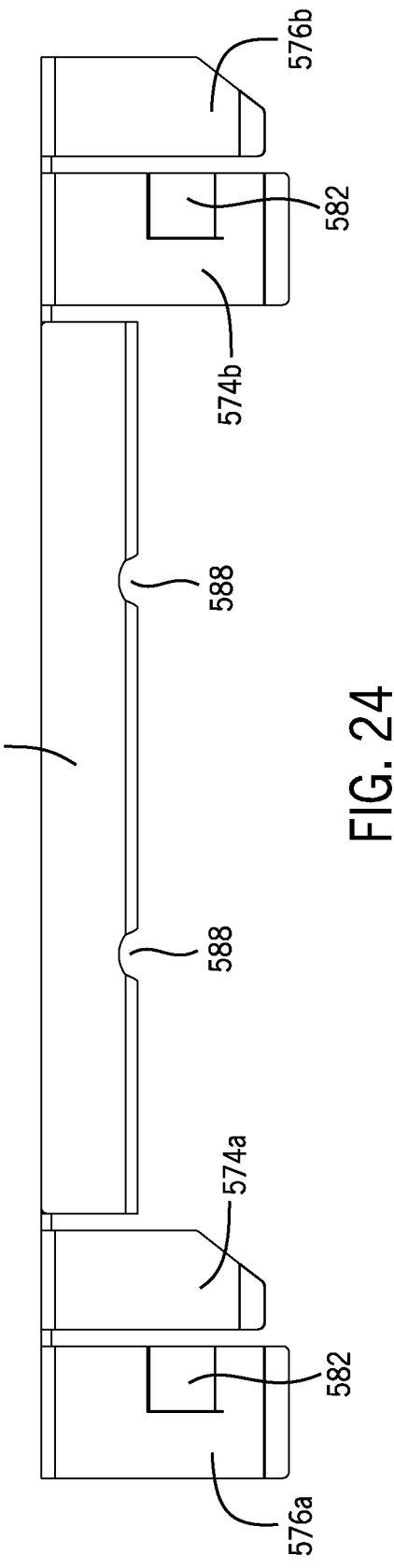

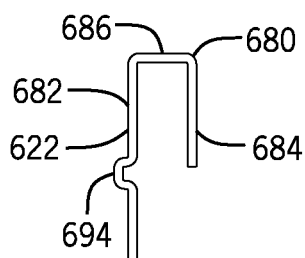
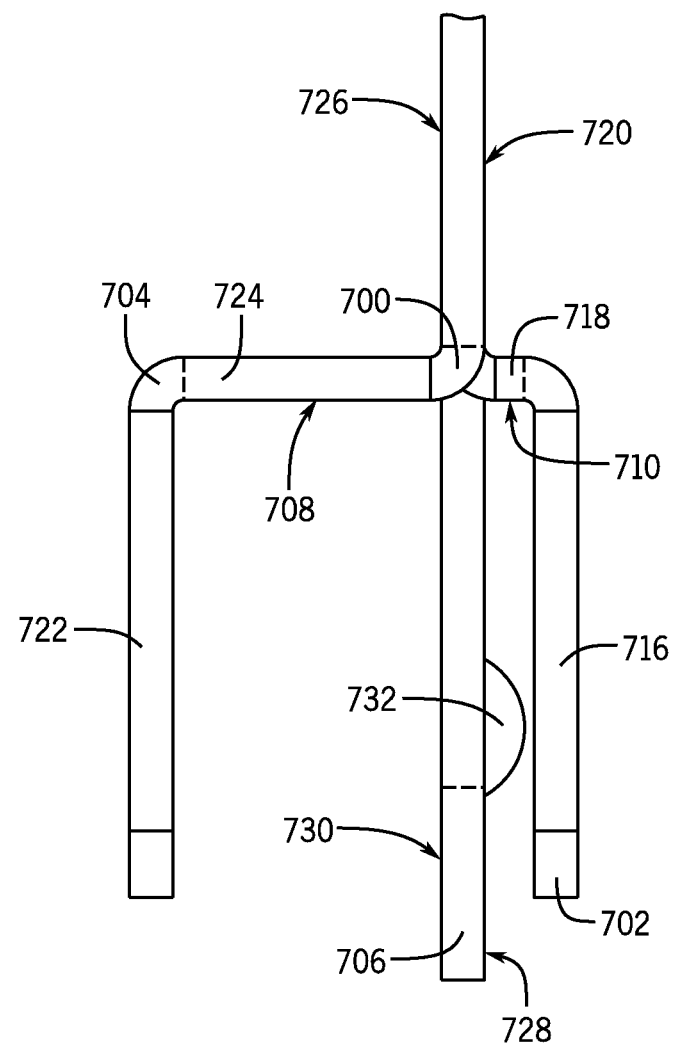
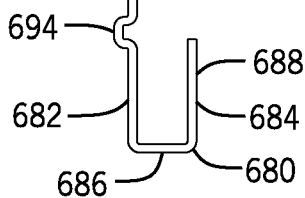
FIG. 32
FIG. 37

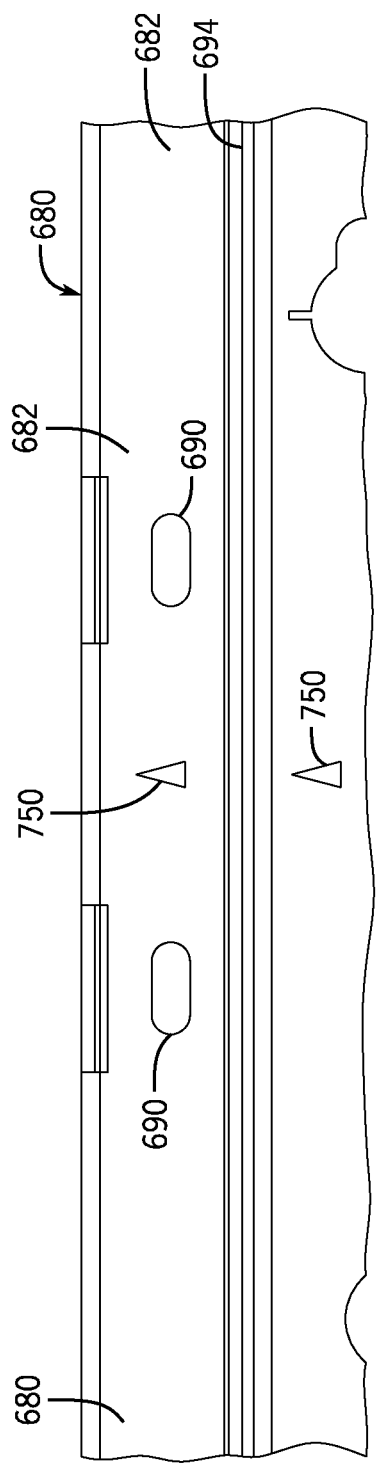
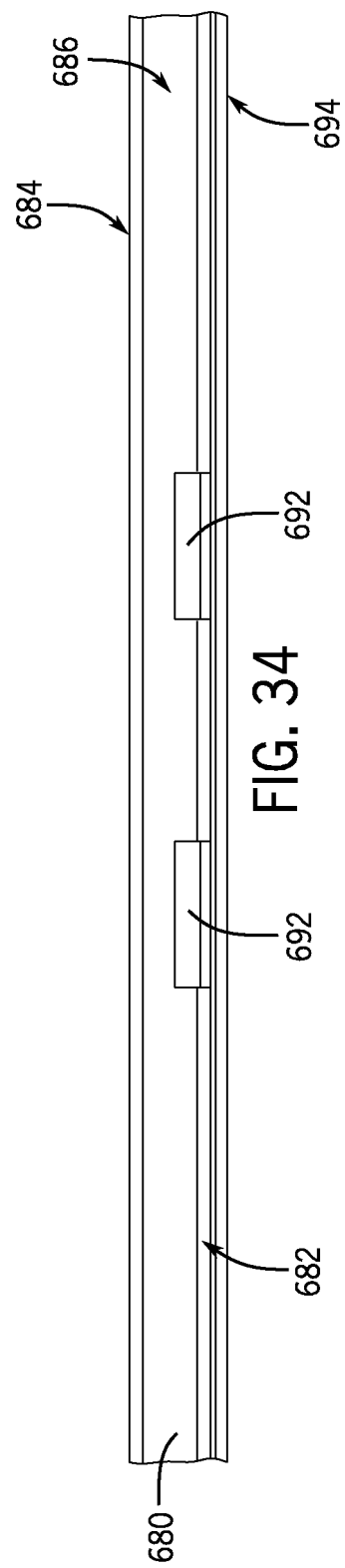

SUPPORT SYSTEM FOR ELECTRICAL BOXES

CROSS-REFERENCE TO RELATED APPLICATIONS

This application claims priority to U.S. patent application Ser. No. 16/529,426, filed Aug. 1, 2019, titled "Support System for Electrical Boxes," which claims priority to U.S. Provisional Patent Application No. 62/713,339, filed Aug. 1, 2018, titled "Support System for Electrical Boxes" and U.S. Provisional Patent Application No. 62/797,083, filed Jan. 25, 2019, titled, "Support System for Electrical Boxes," all of which are incorporated herein by reference.

BACKGROUND

In many applications, it may be useful to support electrical boxes and other components. For example, according to some construction standards, electrical boxes may be required to be supported at particular locations, such as at particular distances from certain other structures or components. In addition, some construction standards may require electrical boxes to be supported at particular heights above a floor or at particular distances from certain other structures or components.

SUMMARY

Some embodiments of the invention provide a box support system for supporting one or more electrical boxes. The box support system can include a box support that includes a first rail, a second rail spaced from the first rail to define a receiving area for an electrical box, and a box-support mounting interface on one or more of the first rail or the second rail. A support attachment with a support-attachment mounting interface that can be manually secured to the box-support mounting interface to secure the support attachment to the box support can also be included. One of the box-support mounting interface or the support-attachment mounting interface can be a first mounting interface that includes: a first channel defined by a first connecting wall that extends between a first side wall and a second side wall, the first connecting wall opposite a first open side of the first channel; and a first insertion slot that extends through the first connecting wall. The other of the box-support mounting interface or the support-attachment mounting interface can be a second mounting interface that includes: a second channel defined by a second connecting wall that extends between a third side wall and a fourth side wall, the second connecting wall opposite a second open side of the second channel, the second channel being sized to nest within the first channel with the first and second open sides of the first and second channels opposite the first and second connecting walls; a first interface arm that extends through the first insertion slot when the second channel is nested within the first channel; and a second interface arm that engages an outside surface of an outside of the first channel when the second channel is nested within the first channel, with the first and second interface arms in an interleaved engagement with the first side wall of the first channel.

Some embodiments of the invention provide a mounting system for connecting a first support and a second support for electrical components. The mounting system can include a first mounting interface that is integrally formed into the first support and can include: a first channel that includes a first side wall, a second side wall, and a first connecting wall that connects the first and second side walls, the first connecting wall opposite a first open side of the first channel; and a first insertion slot opposite the first open side that can extend from inside of the first channel to outside of the first channel. The mounting system can also include a second mounting interface that is integrally formed into the second support and can include: a second channel that includes a third side wall, a fourth side wall, and a second connecting wall that connects the third and fourth side walls, the second channel sized to be nested within the first channel; a first interface arm that is spaced laterally from the second channel and can extend through the first insertion slot when the second channel is nested within the first channel; and a second interface arm that can be spaced laterally from the second channel and can engage an outside surface of the first channel when the second channel is nested within the first channel.

Some embodiments of the invention provide a method of securing a first support for electrical components to a second support for electrical components. The method can include securing a first mounting interface of the first support that includes a first channel to a second mounting interface of the second support that includes a second channel. The securing step can include nesting the second channel within the first channel. The first channel can be formed from a first side wall, a second side wall, and a first connecting wall that connects the first and second side walls, and the second channel can be formed from a third side wall, a fourth side wall, and a second connecting wall that connects the third and fourth side wall. The securing step can further include inserting a first interface arm that extends from the second mounting interface and is laterally spaced from the second channel into a first insertion slot in the first connecting wall of the first mounting interface. The method can further include engaging a second interface arm extending from the second mounting interface and laterally spaced from the first interface arm with an outside surface of the second side wall of the first channel.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 9 is a side sectional view of the box support of FIG. 6;

FIG. 10A is a detailed side sectional partial view of a mounting interface of the box support, as shown in FIG. 9;

FIG. 13 is a front elevation view of a mounting interface of the support attachment of FIG. 1;

FIG. 14 is a side elevation view of the mounting interface of FIG. 13;

FIG. 15 is a top plan view of the mounting interface of FIG. 13;

FIG. 16 is a bottom plan view of the mounting interface of FIG. 13;

FIG. 23 is a front elevation view of a mounting interface according to another embodiment of the invention; and FIG. 24 is a bottom plan view of the mounting interface of FIG. 23.

FIG. 32 is a side sectional view of the box support of FIG. 27;

FIG. 33 is a front elevation view of a mounting interface of the box support of FIG. 27;

FIG. 34 is a top plan view of the mounting interface of FIG. 33;

FIG. 37 is a side elevation view of the mounting interface of FIG. 35;

DETAILED DESCRIPTION

Figure 1:
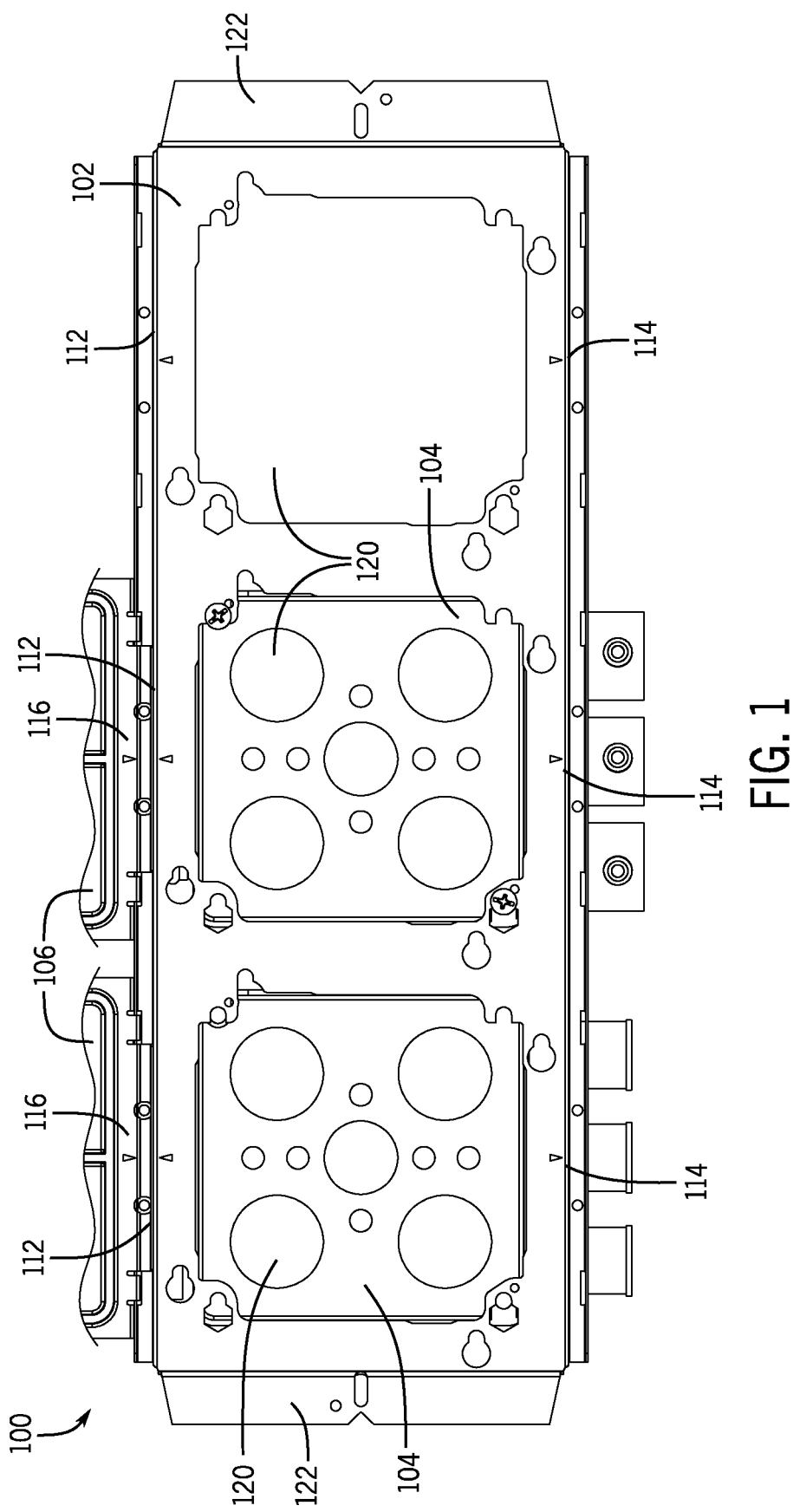
FIG. 1 is a front elevation partial view of a box support system according to an embodiment of the invention, including a box support, electrical boxes, and a set of support attachments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless otherwise specified or limited, the term "C-shaped" specifies a shape that includes a base portion, with at least two leg portions extending in generally similar (e.g., parallel) directions from the base portion. In some embodiments, a "C-shaped" structure can include leg portions extending from opposite ends of the base portion at substantially right angles to the base portion, with or without curved or chamfered connecting regions between the leg portions and the base portion. In some embodiments, leg portions of a C-shaped structure may be curved extensions of a base portion. In some embodiments, a "C-shaped" structure can include legs of different lengths.

Also as used herein, unless otherwise specified or limited, directional terms are presented only with regard to the particular embodiment and perspective described. For example, reference to features or directions as "horizontal," "vertical," "front," "rear," "left," and "right," are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features.

As noted above, in some contexts, it may be useful to support electrical boxes and other components relative to structures. Embodiments of the invention can be useful for this purpose, and others. For example, embodiments of the invention can be used to support one or more electrical boxes at predetermined distances from supporting structures, such as wall studs, or in other predetermined orientations. As another example, embodiments of the invention can include mounting interfaces that allow for quick, toolless connection of box supports for electrical boxes and support attachments, such as cable supports, conduit supports, adjustable floor stands, or any other support attachment. As still another example, embodiments of the invention can accommodate additional structures, such as attachments configured as adjustable mud rings.

In some embodiments, mounting interfaces on separate supports, such as a box support, a conduit support, a floor stand, or a cable support, can be configured to be engaged with each other manually, so that users do not need tools to create a multi-component support assembly. In some embodiments, a box-support mounting interface and a complimentary support-attachment mounting interface can be configured to be interleaved or nested with each other once installed. In some embodiments, the interfaces can include engagement features such as nested channels and interface arms for insertion into and interleaved (and other) engagement with corresponding insertion slots and support surfaces, respectively. Engagement of a support feature by an engagement feature can provide substantial stability for the overall assembly, in part due to the increased surface contact between the support feature and the engagement feature.

FIG. 1 illustrates an assembly configured as a box support system 100 according to an embodiment of the invention. In the illustrated embodiment, the system 100 includes a box support 102 that is configured to support electrical boxes 104 and a plurality of support attachments 106. In other embodiments, including as discussed below, other configurations are possible, including configurations with different numbers or configurations of support attachments, electrical boxes, and so on.

In the illustrated embodiment, the support attachments 106 are configured to be manually engaged with the box support 102 including, in some configurations, without requiring the use of separate fasteners. This can be useful, for example, in order to dispose each of the components in an appropriate location for installation during construction. To this end, as also discussed below, the box support 102 includes a set of top mounting interfaces 112, and a set of bottom mounting interfaces 114. Correspondingly, the support attachments 106 each include a corresponding mounting interface 116. In the embodiment illustrated, each of the mounting interfaces 112, 114 are substantially identical to each other, so that the box support 102 can be identically used in the orientation shown or in a reversed orientation. Similarly, the mounting interfaces 116 are also substantially identical to each other, so that the support attachments 106 are interchangeably attached to any mounting location on any of the mounting interfaces 112, 114 on the box support 102. In other embodiments, other configurations are possible.

As also noted above, the box support 102 is configured to support multiple electrical boxes 104. In the arrangement illustrated in FIG. 1, the electrical boxes 104 are configured as 4"×2⅛" boxes. In other configurations, other types of boxes, can be used. For example, some embodiments can be configured to support 4"×1½" boxes, 4 11/16"×2⅛" boxes, or other sizes of electrical boxes, including electrical boxes with different depths (i.e., as measured into the page in FIG. 1). Usefully, the box support 102 includes a number of keyhole openings that surround substantially identical cut-outs 120 for the electrical boxes 104. The configuration and disposition of the keyhole openings can allow electrical boxes of different sizes to be readily attached at the various cut-outs. In some embodiments, such as illustrated in FIG. 1, one or more of the keyhole openings can be shaped differently to indicate correspondence with different box sizes. For example, entry portions of the keyhole openings can be round or hexagonal, or otherwise indicated, in order to guide installation of screws for particular sizes of electrical boxes.

A support according to embodiments of the invention can be secured to other structures in different ways. In the embodiment illustrated in FIG. 1, for example, mounting holes are provided on opposite ears 122 of the box support 102. During installation, self-drilling screws can be driven through the mounting holes into underlying studs (or other structures) in order to quickly secure the box support 102 in place. In other embodiments, other configurations are possible.

Figure 2:
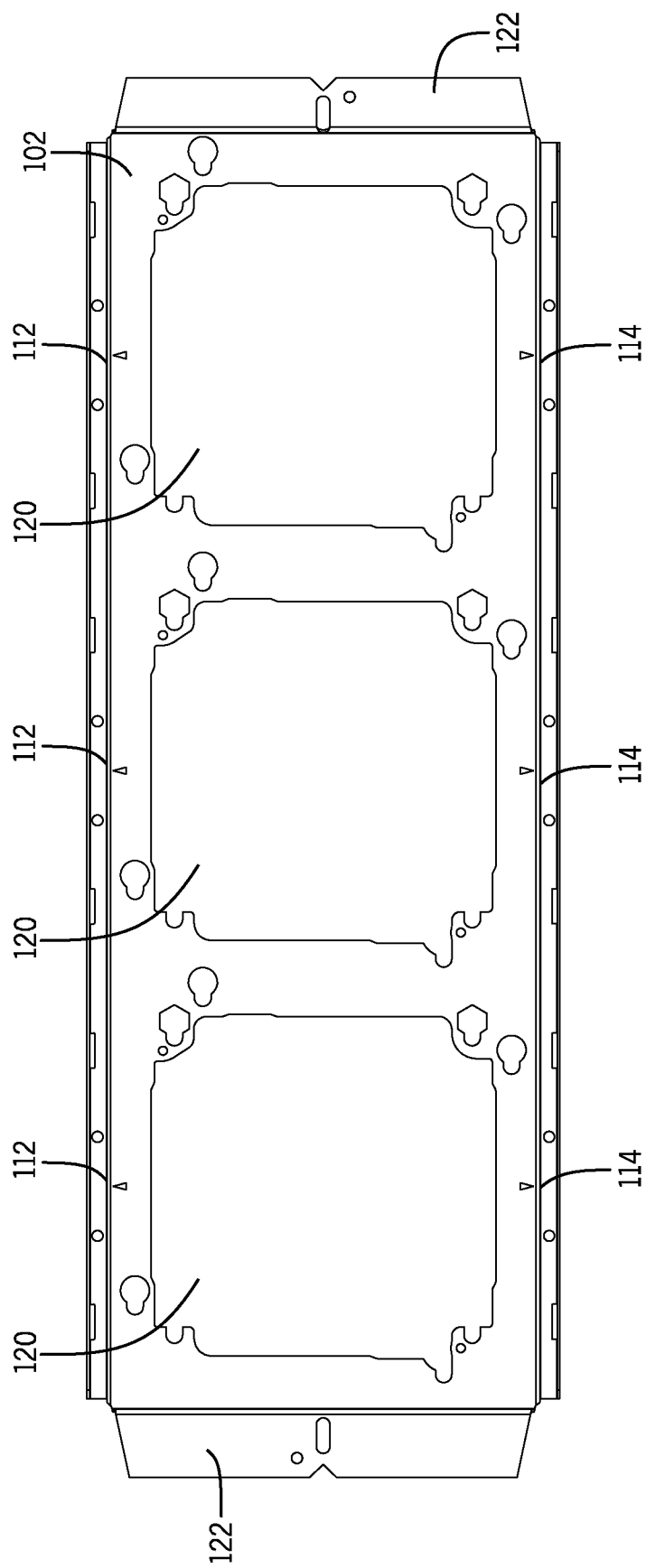
FIG. 2 is a front elevation view of the box support of FIG. 1, without electrical boxes or support attachments.
Figure 3:
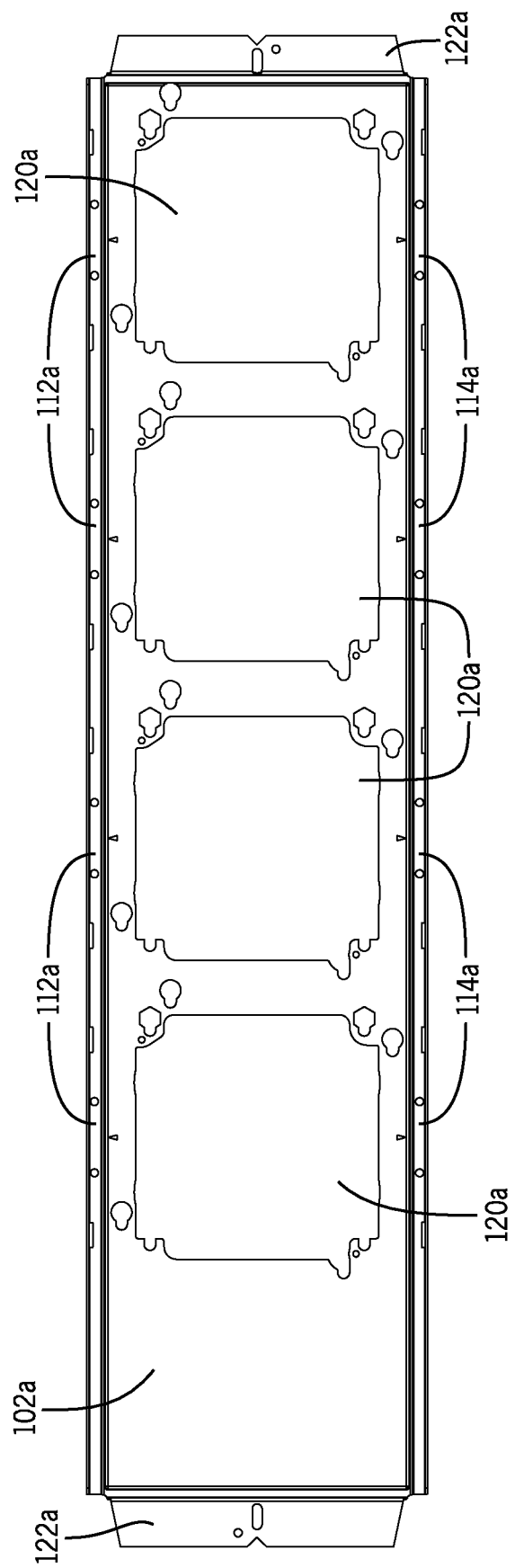
FIG. 3 is a front elevation view of a box support system according to another embodiment of the invention.

FIG. 2 illustrates the box support 102 of the box support system 100, without the support attachments 106 or the electrical boxes 104 attached thereto. Similarly, FIG. 3 illustrates another box support 102a according to another embodiment of the invention. Generally, the box support 102a is configured similarly to the box support 102, with reference numbers having an appended "a" indicating similar features as described above for the box support 102. Unless otherwise stated or required, discussion below relating to the box support 102, or components thereof, generally applies also to the box support 102a and components thereof.

Despite the noted similarity, the box support 102a is different from the box support 102 in some aspects. For example, the box support 102 is configured with a 16" length and three of the cut-outs 120, whereas the box support 102a is configured with a 24" length and four of the cut-outs 120a. Correspondingly, the box support 102a is configured to support an additional electrical box, and can also support additional support attachments with corresponding mounting interfaces 112a, 114a.

Figure 4:
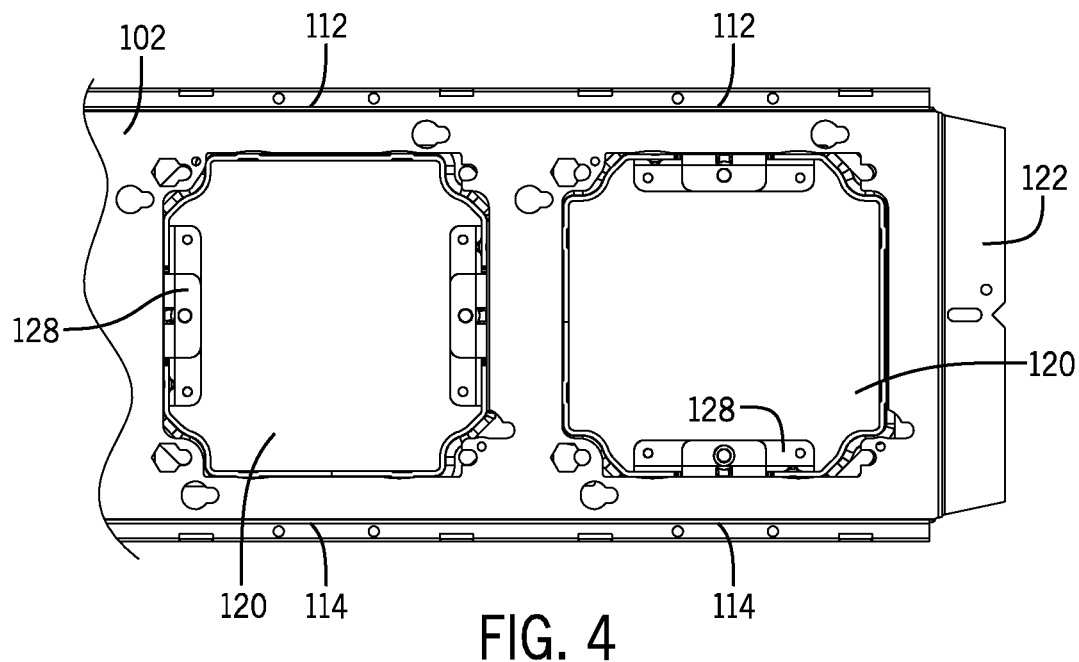
FIG. 4 is a rear elevation partial view of the box support of FIG. 3, with adjustable mud rings installed.

In some embodiments, configurations of cut-outs on a box support, such as the cut-outs 120, can allow for functionality other than to mere access to electrical boxes. For example, as illustrated in FIG. 4, lateral, top, and bottom sides of the cut-outs 120 of the box support 102 include extended side portions. This may be useful, for example, in order to accommodate fasteners used for adjustment of adjustable mud rings 128, or for other purposes. For example, as fasteners are actuated to adjust the adjustable mud rings 128, the fasteners can readily pass through the extended side portions, in order to avoid interference with structures of the box support 102. In the embodiment illustrated, with the extended side portions included on all four sides of the cut-outs 120, the adjustable mud rings 128 can be mounted for adjustment in either horizontal (on left in FIG. 4) or vertical (on right in FIG. 4) configurations.

Figure 5:
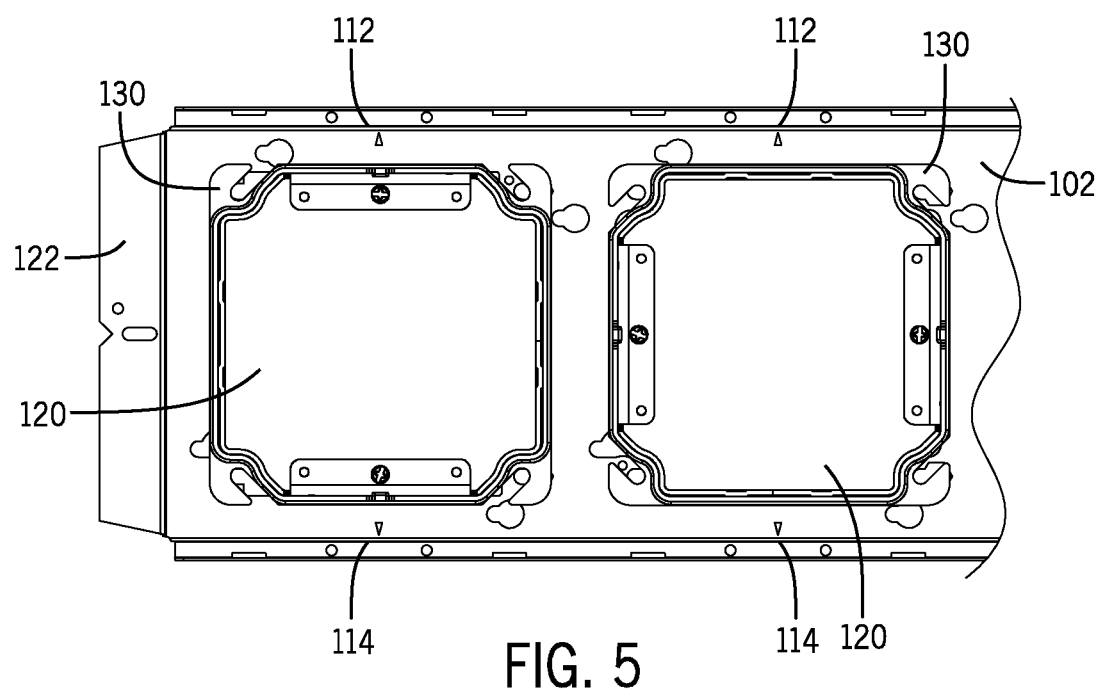
FIG. 5 is a front elevation partial view of the box support of FIG. 3, with mud rings installed.

In some embodiments, mounting openings on a box support can accommodate relatively easy attachment of other components. In one example, the box support 102 includes a set of relatively small mounting holes disposed relatively close to some of the keyhole openings for attachment of electrical boxes. Usefully, the mounting holes can receive self-tapping screws in order to attach mud rings 130 in horizontal (on right in FIG. 5) or vertical (on left in FIG. 5) orientations. This may be appropriate, for example, for low voltage applications in which electrical boxes may not necessarily also be used.

Figure 6:
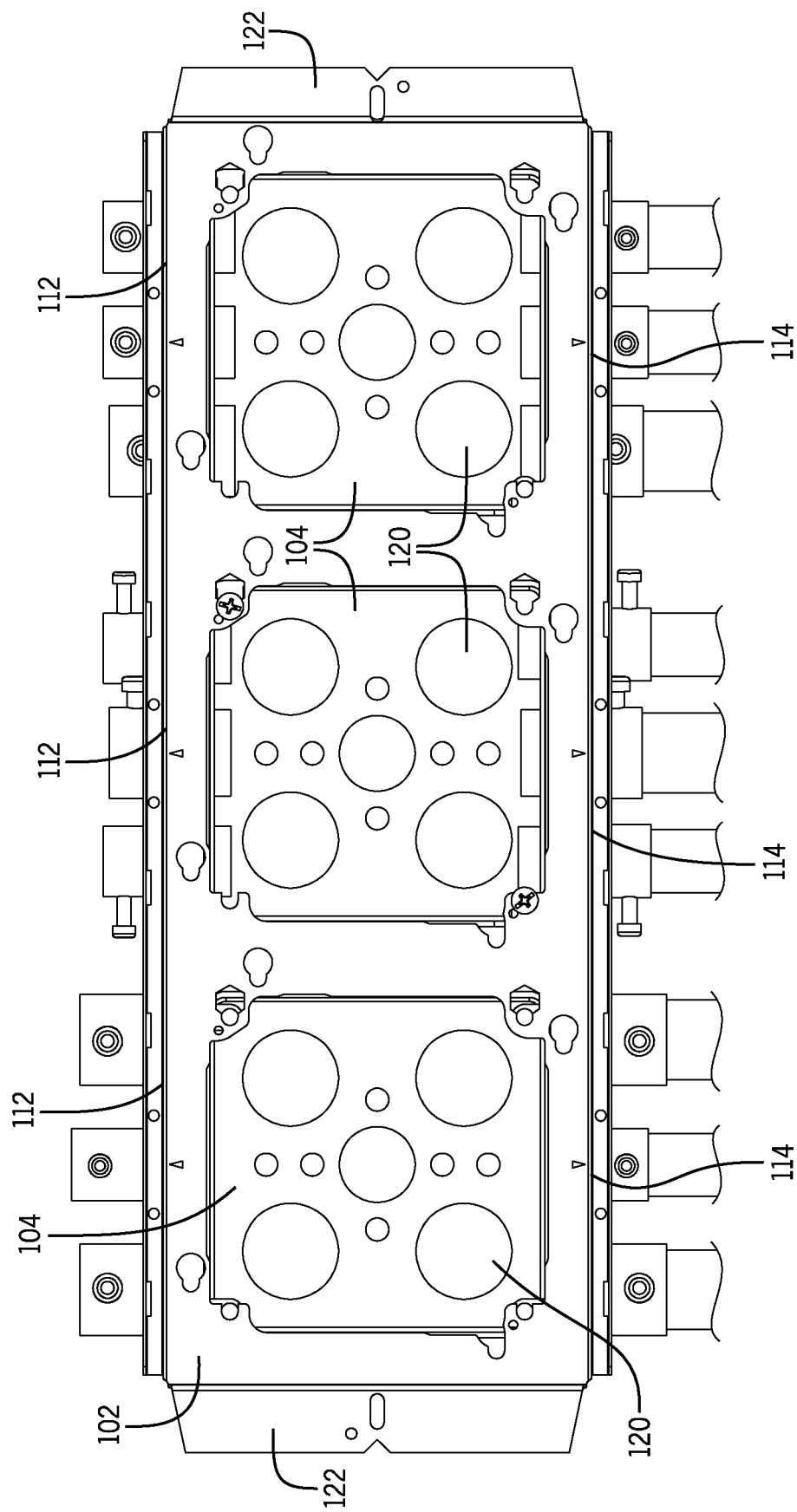
FIG. 6 is a front elevation view of a box support system arranged according to an embodiment of the invention.

FIG. 6 illustrates the box support 102 of the box support system 100, without the support attachments 106 attached thereto. In the illustrated arrangement, as also shown in FIG. 1, each of the electrical boxes 104 includes a set of fittings that can enclose conductors extending into the electrical boxes 104. For example, among many others, ¾" fittings and ½" fittings extend from the electrical box 104. In the illustrated configuration, each of the fittings illustrated includes a fitting screw extending from a front side thereof. The electrical boxes 104 can each include the same or a different number of fittings, and the arrangement of fittings can be symmetrical or non-symmetrical. In another embodiment, electrical boxes could have more fittings, less fittings, or no fittings on the top side, the bottom side, or on both sides.

In the illustrated embodiment, the box support 102 is dimensioned to provide enough clearance between each of the fitting screws, and the front face and the top (or bottom) edge of the box support 102 to provide access to the fitting screws from the front side of the box support 102 while the fittings are positioned in the electrical boxes 104. This can be useful in order to provide access to the fitting screws so that the conduits (e.g., EMT conduits) and cables (e.g., MC cables) can be attached to fittings on the box support system 100 after the electrical boxes 104 are secured to the box support 102, and so that the fitting screws can be loosened or tightened as needed, including from the front side of the box support 102.

Figure 7:
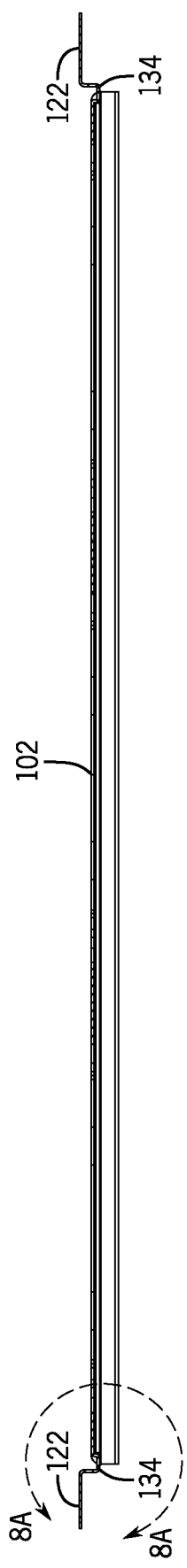
FIG. 7 is a top sectional view of the box support of FIG. 6.
Figure 8A:
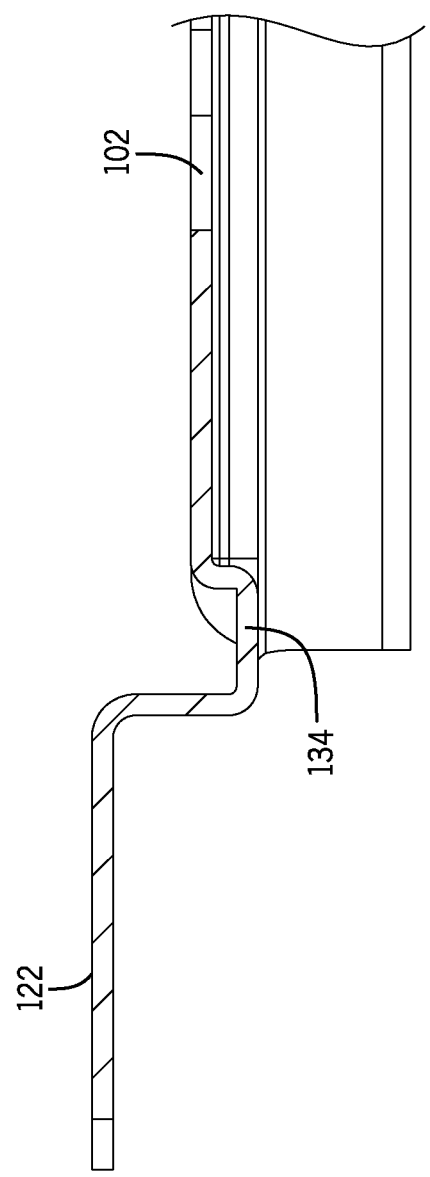
FIG. 8A is a detailed top sectional partial view of the box support, as shown in FIG. 6.
Figure 8B:
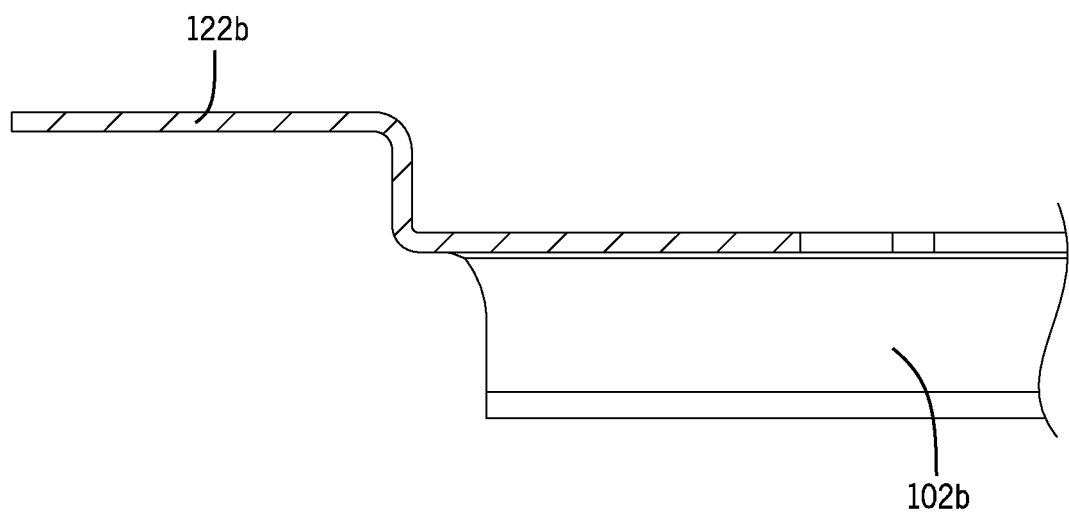
FIG. 8B is a detailed top sectional partial view of a box support according to another embodiment of the invention.

As illustrated in FIGS. 7 and 8A, portions of the box support 102 can be embossed, providing a corresponding extruded section 134 between the ears 122 and the front face of the box support 102. This can be useful, for example, in order to enhance the rigidity of the box support 102. In the illustrated embodiment, the extruded sections 134 are identical—each being recessed about 0.06" from the front face of the box support 102. In other embodiments, however, the extruded sections can be recessed more or less than the illustrated embodiments. A box support can also have at least one differently sized or shaped extruded section, and at least one extruded section can extend outward from the face of the box support in the opposite direction as the illustrated extruded sections. Further, in some embodiments, at least one of the extruded sections can be omitted. As illustrated in FIG. 8B, for example, a box support 102b may not include any extruded sections between the ears 122b and the front face of the box support 102b.

As also discussed above, embodiments of the box support can include box-support mounting interfaces that can allow for manual, secure, and somewhat interchangeable attachment of different support attachments. An example configuration for the top mounting interface 112 of the box support 102 is illustrated in FIGS. 9-12. In the illustrated embodiment, a substantially identical configuration can be used for the bottom mounting interfaces 114. Alternatively, some embodiments can use different top or bottom mounting interfaces. In some embodiments, a similar or substantially identical configuration can be used for other supports according to embodiments of the invention. For example, configurations similar to the mounting interfaces 114 can be provided on structures to be attached to a box support, with a complementary mounting interface (e.g., as described below) on the box support itself.

As illustrated in FIG. 9, each of the top and bottom mounting interfaces 112, 114 collectively includes a support feature 140 with a first channel 142 that is configured in a C-shape and includes a first side wall 144, a second side wall 146 opposite the first side wall 144, and a first connecting wall 148 extending generally between the back ends of the first and second side walls 144, 146. An open side is defined between the first and second side walls 144, 146, opposite the first connecting wall 148, such that the mounting interfaces 112, 114 define open-sided channels.

In different embodiments, different configurations for a channel of a mounting interface are possible. In the illustrated embodiment, for example, the first side wall 144 extends horizontally away from the box support 102 (in the illustrated orientation) in a direction opposite a mounting face to which the electrical boxes 104 can be secured. The first connecting wall 148 is substantially parallel to the mounting face and extends vertically upward (or downward, for the bottom mounting interfaces 114) from the back end of the first side wall 144 to the back end of the second side wall 146. The second side wall 146, which is substantially parallel to the first side wall 144, extends forward and away from the first connecting wall 148, ending at a front end of the second side wall 146 that is in vertical alignment with the mounting face of the box support 102. Further, in the illustrated embodiment, the side walls 144, 146 and the connecting wall 148 are continuously connected to form a continuous channel. In other embodiments, however, other configurations are possible, including non-parallel, non-squared, and non-continuous configurations.

In the illustrated embodiment, the support features 140 of each of the top mounting interfaces 112 (and the bottom mounting interfaces 114) are linked in a single continuous structure that extends along the entire length of the top of the box support 102, thereby providing relatively significant rigidity and strength. For example, the geometry of the support feature 140 (and the C-shaped channel 142 of the support feature 140) can provide relatively high stiffness for bending and torsional moments, so that the box support 102 is resistant to twisting and other deformation (e.g., bending). In the illustrated embodiment, the first side wall 144, the second side wall 146, and the first connecting wall 148 are integrally formed in the box support 102. In other embodiments, other configurations are possible.

In some embodiments, at least one of the support features 140 can be configured in alternative shapes or structures (e.g. V-shaped channels, etc.) that can also provide structural stability to the box support 102. For example, the support feature 140 can be configured with different angular relationships between various walls 144, 146, 148 (or other sections) of the first channel 142 and the faces of the box support 102. Further, the support feature 140 can be formed from multiple discontinuous features in some embodiments.

In some embodiments, other features and aspects can be provided to assist in securing support features to the box support at mounting interfaces, as well as to provide other useful functionality. In the embodiment illustrated, for example, each of the mounting interfaces 112, 114 includes two insertion slots 150 (see FIGS. 11 and 12) that are configured to receive a portion of a corresponding support attachment. In the embodiment illustrated, the insertion slots 150 are configured as elongate horizontal slots that are disposed generally adjacent to the second side wall 146 and extend fully through the first connecting wall 148 from the interior of the first channel 142 to the exterior of the first channel 142. In other embodiments, however, other configurations are possible.

Figure 11:
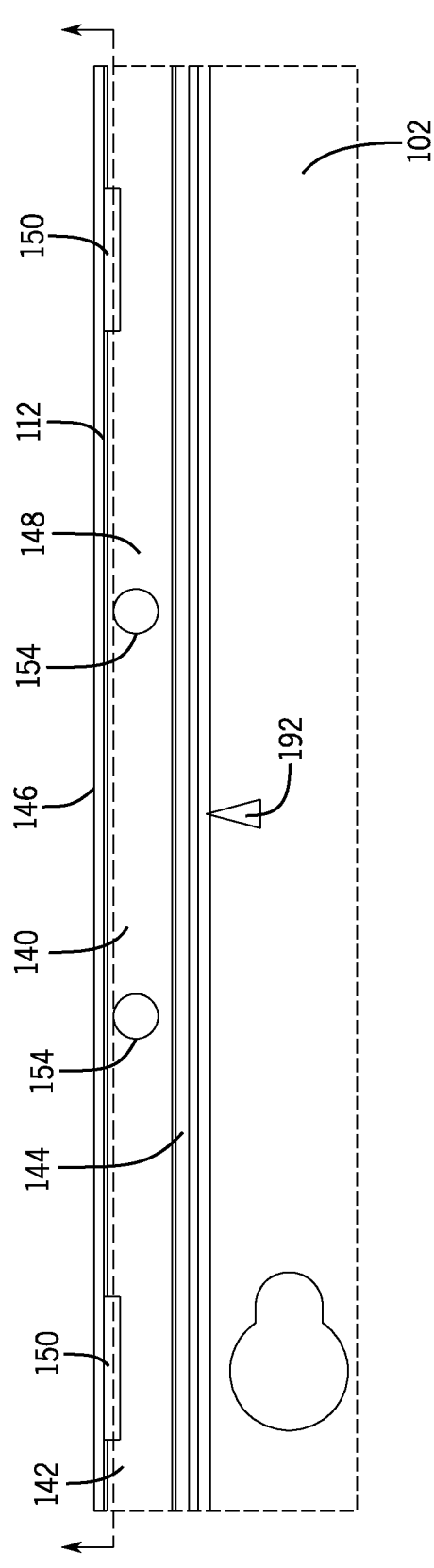
FIG. 11 is a front elevation view of a mounting interface of the box support of FIG. 1.
Figure 12:
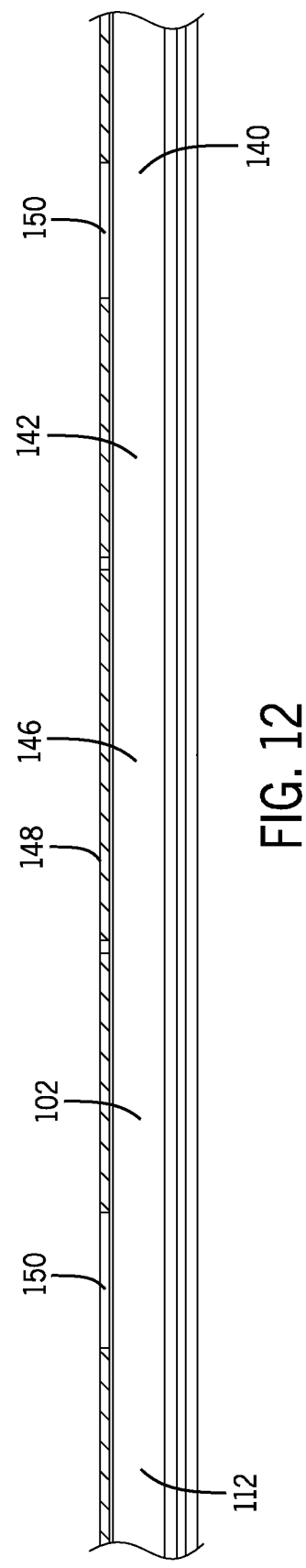
FIG. 12 is a top plan view of the mounting interface of FIG. 11.

As illustrated in FIG. 11 in particular, each of the mounting interfaces 112, 114 also includes a set of locking openings 154 formed through the first connecting wall 148. As will be described in greater detail below, each of the locking openings 154 is configured to receive a fastener (not shown) to secure the support attachment 106 to the box support 102. In other embodiments, other configurations of the locking openings 154 are possible. For example, in some configurations, a locking opening for multiple fasteners can be collectively formed as a single, continuous opening. Similarly, in some embodiments, a locking opening can be formed as a single, continuous opening that is configured for use with multiple adjacent instances of the mounting interfaces 112, 114 (or other mounting interfaces). In some embodiments, a locking opening can be provided on a different part of a mounting interface than is illustrated for the mounting interfaces 112, 114, or can exhibit a different geometry than illustrated in, for example, FIG. 11.

Figure 10B:
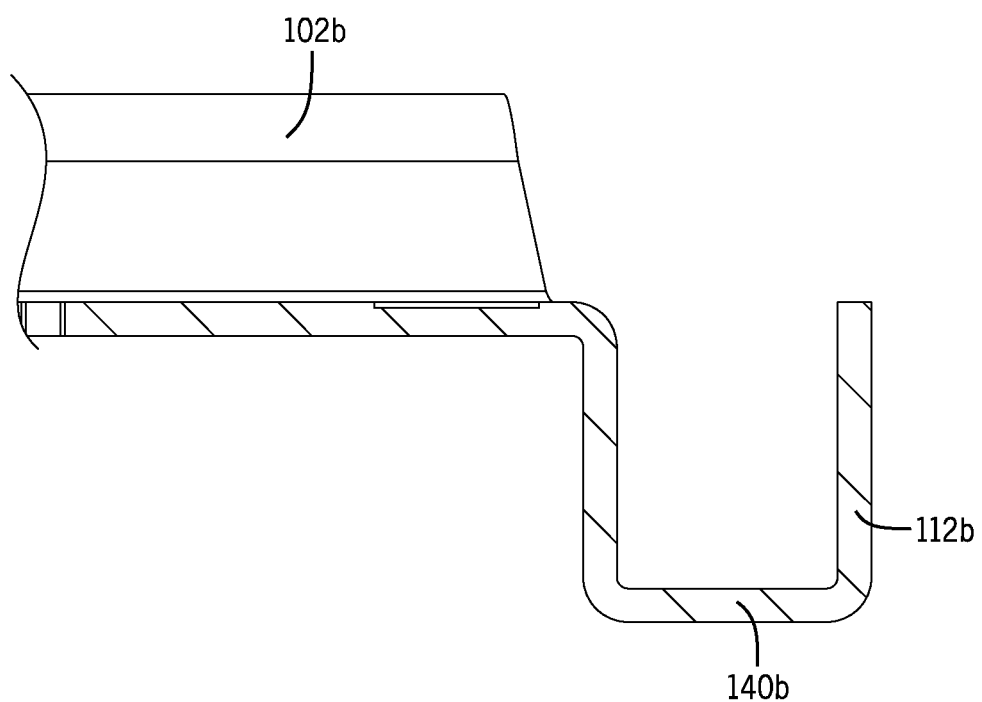
FIG. 10B is a detailed side sectional partial view of a mounting interface of a box support, according to another embodiment of the invention.

In some embodiments, other features can be included on the box support 102. For example, as illustrated in FIGS. 9 and 10A in particular, the box support 102 includes an embossed ridge 156 that extends across the entire lateral length of the box support 102 (other than the ears 122). Similarly to the extruded sections 134, the embossed ridge 156 can provide further structural reinforcement for the box support 102, including with regard to resistance to torsion, with the horizontal orientation of the embossed ridge allowing for easy installation of electrical boxes of different sizes. In some embodiments, a box support can have at least one differently sized or shaped embossed ridge, and at least one of the embossed ridges can be omitted. As illustrated in FIG. 10B, for example, a box support 102b may not include any embossed ridges formed proximate the support features 140b.

In some embodiments, a support attachment can include a support-attachment mounting interface that is generally complimentary to the configuration of a box-support mounting interface, such as the interfaces 112, 114 discussed above. FIGS. 13-16 illustrate an example configuration for the mounting interfaces 116 of the support attachments 106 that is generally complimentary to the configuration of the top mounting interface 112 as illustrated in FIGS. 9-12. In some embodiments, a substantially identical configuration can be used for other attachment mounting interfaces. In this way, for example, any of these mounting interfaces can interchangeably engage any one of the top or bottom mounting interfaces 112, 114. In other embodiments, other mounting interfaces with other engagement features can be used on other supports (e.g., other attachments). In some embodiments, multiple mounting interfaces can be included on a single support attachment.

In the illustrated embodiment, the mounting interface 116 includes an engagement feature 164 that is generally complimentary to the support feature 140 on the corresponding top mounting interface 112 (see, e.g., FIGS. 9-12). In this regard, for example, the engagement feature 164 includes multiple distinct types of interface features. For example, the engagement feature 164 includes a second channel 166 that includes a third side wall 168, a fourth side wall 170, and a second connecting wall 172 that connects the third and fourth side walls 168, 170. An open side is defined between the third and fourth side walls 168, 170, opposite the second connecting wall 172, such that the mounting interfaces 116 defines an open-sided channel. Further, the engagement feature 164 also includes inner interface arms 174 and outer interface arms 176. As discussed in further detail below, the second channel 166 is configured to nest within the first channel 142 and the inner and outer interface arms 174, 176 are configured for interleaved engagement with the second side wall 146. Further, the inner interface arms 174 are configured to be inserted into the corresponding insertion slots 150. In other embodiments, other configurations are possible.

Figure 17:
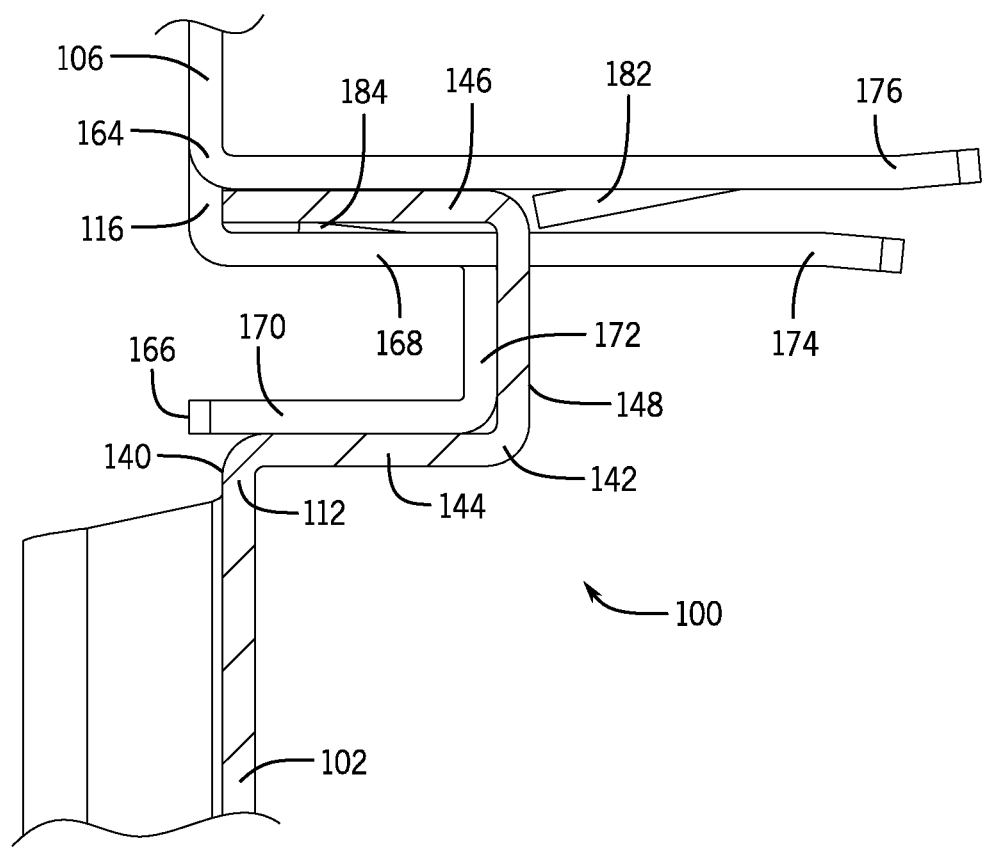
FIG. 17 is a side sectional partial view of the box support system of FIG. 1, with the mounting interfaces of FIGS. 11 and 13 secured together after assembly.

In the embodiment illustrated, the second channel 166 is configured in a C-shape similar to that of the first channel 142. The third side wall 168 is positioned proximate a bottom edge of the support attachment 106 and extends horizontally away therefrom. The second connecting wall 172 extends downward from a back end of the third side wall 168 to a back end of the fourth side wall 170, which extends back towards the front face of the support attachment 106. Similarly to the corresponding segments of the first channel 142, the second connecting wall 172 is substantially parallel to the front face, and the third side wall 168 is substantially parallel to the fourth side wall 170, which has a front end that is in vertical alignment with the front face of the support attachment 106. Further, in the illustrated embodiment, the side walls 166, 168 and the connecting wall 172 are continuously connected to form a continuous channel. In other embodiments, however, other configurations are possible, including non-parallel, non-squared, and non-continuous configurations As previously discussed, the second channel 166 is configured to be nested in the first channel 142. For example, as illustrated in FIG. 17 in particular, the second connecting wall 172 is dimensioned so that, when the engagement feature 164 engages the support feature 140 (as described in further detail below), the third and fourth side walls 168, 170 generally abut the second and first side walls 146, 144, respectively, with substantially all of the first side wall 144 flush with the fourth side wall 170. Further, the third side wall 168 is dimensioned so that the second connecting wall 172 abuts the first connecting wall 148, with substantially all of the second connecting wall 172 flush with the first connecting wall 148, and a back face of the support attachment 106 is generally coplanar with the mounting face of the box support and abuts the front end of the second side wall 146.

In other embodiments, the second channel 166 may have other configurations. For example, an engagement feature 164 can include multiple channel segments in addition to, or in place of, the continuous channel of the illustrated embodiment. Likewise, the third side wall 168 can be dimensioned so that the second connecting wall 172 does not abut the first connecting wall 148, or so that the back face of the support attachment 106 does not abut the front end of the second side wall 146. Further, the second connecting wall 172 can be dimensioned so that the fourth side wall 170 does not abut the first side wall 144. In other embodiments, still other configurations are possible.

With continued reference to FIGS. 13-16, the engagement feature 164 includes two inner interface arms 174 and two outer interface arms 176. The second channel 166 is centrally positioned along the lateral length of the engagement feature 164, and the outer interface arms 176 are positioned symmetrically on opposite sides of the second channel 166, proximate the lateral ends of the engagement feature 164 and spaced laterally apart from the second channel 166. The two inner interface arms 174 are located symmetrically between and spaced laterally apart from a respective one of the outer interface arms 176 and the second channel 166. Further, each of the arms 174 has a position (and a spacing therebetween) that corresponds to a location and spacing of the corresponding insertion slot 150 on the support feature 140. The inner interface arms 174 are positioned proximate the bottom edge of the support attachment 106 and extend horizontally away from the front face thereof so that the inner interface arms 174 are substantially coplanar with the third side wall 168. The outer interface arms 176 extend horizontally from the support attachment 106 in substantially the same direction as the inner interface arms 174 and the third side wall 168, but are positioned above the inner interface arms 174 to define a vertical gap therebetween (see, e.g., FIG. 14). This can, for example, allow for attachment of the support attachment 106 to the box support 102 by moving the engagement feature 164 in a direction that is generally perpendicular to the front face of the box support 102. This may also be useful to help secure mounting interfaces 112, 166 together when the box support 102 is secured in a confined location with minimal clearance above the installed support attachment 106.

In the illustrated embodiment, the inner interface arms 174 extend farther away from the support attachment 106 than does the third side wall 168, and the outer interface arms 176 extend farther from the support attachment 106 than does the inner interface arms 174. As further described below, this can be useful, for example, in order to help align the engagement feature 164 with the corresponding support feature. Similarly, the outer interface arms 176 and the inner interface arms 174 have vertical positions selected so that the second side wall 146 of the support feature 140 can be relatively snugly received in the gap between the inner and outer interface arms 174, 176. This may be useful, for example, to provide relatively substantial rigidity to the support attachment 106 overall, when secured to a box support using the engagement feature 164.

In other embodiments, other configurations are possible. For example, other embodiments of an engagement feature can be configured with different angular relationships between various sections of a channel, inner and outer (or other) interface arms, and certain faces of a support attachment. Further, some embodiments can include additional inner and outer (or other) interface arms, fewer inner and outer (or other) interface arms, or the same number of inner and outer (or other) interface arms as the illustrated embodiments. Some embodiments can be configured with alternative positions for at least one of the inner and outer interface arms, such as described below relative to FIGS. 21-24. In some embodiments, at least two inner, outer, or other interface arms can be formed by a single continuous feature. In some embodiments, other, differently configured interface arms can be used.

In some embodiments, other features and aspects can be provided to assist in securing support features to the box support at mounting interfaces, as well as to provide stability and other useful functionality. In some embodiments, locking protrusions, including flaps, detents, flanges, or other protrusions can be provided to help secure channels of two mounting interfaces in a nested configuration with appropriate abutment between corresponding walls. In the embodiment illustrated, for example, the outer interface arms 176 each include a biased locking protrusion 182 that is configured to resiliently move between extended and retracted positions. In the extended position, the biased locking protrusions 182 taper downward between a first end that is connected to the respective outer interface arm 176 proximate a back end thereof, and a second end positioned forward relative to the first end. When in the retracted position, the biased locking protrusions 182 are configured to be generally coplanar and flush (or otherwise more closely aligned) with the surfaces of the outer interface arms 176. In some embodiments, as alluded to above, a locking protrusion such as the locking protrusions 182, can be biased to rest in an extended position but can be manually movable (e.g., with or without tools) to a retracted position, as needed.

The second channel 166 also includes two biased locking protrusions 184—similarly structured to the biased locking protrusions 182 on the outer interface arms 176—that are formed on the third side wall 168. In their extended positions, the biased locking protrusions 184 each taper upward from a first end connected to the third side wall 168 proximate the second connecting wall 172, and a second end positioned towards the front face of the support attachment 106. The biased locking protrusions 184 on the second channel 166 are configured to be generally coplanar and flush (or otherwise more closely aligned) with the surfaces of the third side wall 168 in the retracted position. As further explained below, the biased locking protrusions 182, 184 of the outer interface arms 176 and the second channel 166 are configured to bear against the first channel 142 to help retain the engagement feature 164 on the support feature 140, and to bias the first and second channels 142, 166 into firm engagement with each other.

In some embodiments, other configurations are possible. For example, different geometries, locations, numbers, or other aspects of biased locking protrusions are possible. In some embodiments, at least one biased locking protrusion can be coupled to alternative portions of an engagement feature. For example, in some embodiments, at least one of the inner interface arms 174 can include a biased locking protrusion configured to bear against the inner surface of the first side wall 144, or a biased locking protrusion configured to bear against the outer surface of the first connecting wall 148. Similarly, the outer interface arms 176 can be configured to each have a biased locking protrusion that is configured to bear against the outer surface of the first side wall 144.

In still other embodiments, a similar or other locking protrusion can alternatively (or additionally) be included on the second channel 166, the inner interface arms 174, the outer interface arms 176, or on the support feature 140 of a box support 102 mounting interfaces 112, 114. In some embodiments, locking protrusions and openings can be formed on particular mounting interfaces, including mounting interfaces similar to those expressly described above.

As may also be useful to help secure mounting interfaces together, and as illustrated in FIG. 13, each of the support attachment 106 mounting interfaces 116 can include a set of locking openings 188 formed through the second connecting wall 172. Each of the locking openings 188 has a position that corresponds to a corresponding one of the locking opening 154 on the support feature 140 (see, e.g., FIG. 11), and is configured to allow simultaneous engagement of each set of the corresponding locking openings 154, 188 by a fastener. While not necessarily required to secure the mounting interfaces 112, 116 together for installation and use, this fastened arrangement may provide, for example, a more secure connection to allow the support attachment 106 and the box support 102 to be assembled together and then shipped elsewhere for installation. Similar to the locking openings 154 on the box-support mounting interfaces 112, 114, embodiments of the locking openings 188 can have a variety of different configurations which may be the same or different than the configuration of the corresponding locking opening 154.

Figure 18:
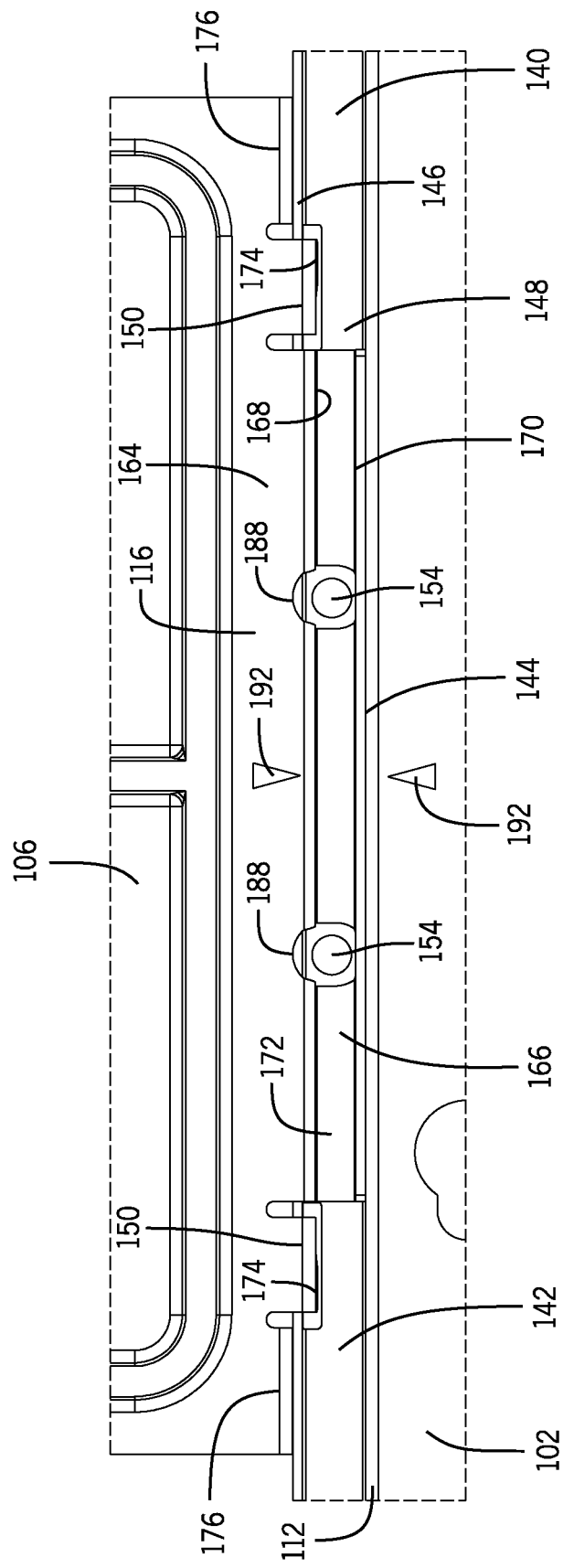
FIG. 18 is a front elevation partial view of the box support system of FIG. 1, including the mounting interfaces as shown in FIG. 17.

FIGS. 17-18 illustrate an example of engagement between the engagement features 164 of the mounting interface 116 and the support features 140 of the top mounting interface 112, which can be accomplished manually and without the use of any tools. In some embodiments, a cable support, a conduit support, or another support, can be similarly secured to a support such as the box support 102 in the same, or a similar, manner.

To secure the support attachment 106 to the box support 102, the respective mounting interfaces 112, 116 can first be generally aligned with each other. In this regard, for example, the outer interface arms 176, which are longer than the inner interface arms 174, can provide an alignment guide by engaging the top surface of the second side wall 146 to place the inner interface arms 174 in horizontal alignment with the insertion slots 150. The support attachment 106 can then be moved (e.g., translated) laterally until the inner interface arms 174 are aligned with, and can be inserted into, the insertion slots 150. In some embodiments, for example, a visual alignment indicator 192 disposed on at least one of the support attachment or the box support 102 (see FIG. 18) can also be used to aid in alignment. Similarly, features on a particular interface arm, such as an angled end as illustrated for the interface arms 174, can interact with a corresponding insertion slot (or other feature) to further help to align mounting interfaces to be secured together.

Once the mounting interfaces 112, 116 are appropriately aligned, the support attachment 106 can be moved towards the box support 102, thereby inserting the second channel 166 into nested engagement with the first channel 142. As the first and second channels 142, 166 move into a nested arrangement, the second side wall 146 depresses the biased locking protrusions 182, 184, moving them into (or towards) their closed positions. Once the second channel 166 is fully inserted, the biased locking protrusions 182 on the outer interface arms 176 can resiliently return to (or towards) their extended positions and thereby bear against the outer surface of the first connecting wall 148 of the first channel 142. This can, for example, help to more firmly secure the mounting interfaces 112, 116 together, for a more secure support of the support attachment 106 and allow for visible assurance that the mounting interfaces 112, 116 are in engagement with one another. Similarly, with the channels 142, 166 nested together, the biased locking protrusions 184 on the second channel 166 can resiliently return to (or towards) their extended positions to bear against the inner surface of the second side wall 146 of the first channel 142. Again, for example, this can help to more firmly secure the mounting interfaces 112, 116 together, for a more secure support of the support attachment 106.

Further, in the illustrated installed configuration, the engagement feature 164—and the interface arms 174, 176 in particular—is engaged in interleaved contact with the support feature 140—in particular, the second side wall 146 of the channel 142. This arrangement can, for example, further contribute to a relatively stable connection between the support attachment 106 and the box support 102.

In this regard, for example, in the embodiment illustrated in FIGS. 17 and 18, the biased locking protrusions 184 on the second channel 166 biases the lower surface of the outer interface arms 176 into engagement with the outer surface of the channel 166, and biases the lower surface of the fourth side wall 170 into engagement with the inner surface of the channel 142. Further, the biased locking protrusions 184 continues to bear against the inner surface of the first channel 142, which can be useful in order to provide enhanced rigidity. Once extended, the biased locking protrusions 182 on the outer interface arms 176 bear against the first connecting wall 148 to hold the outer surface of the second connecting wall 172 of the second channel 166 in engagement with the inner surface of the first channel, and to inhibit disengagement of the mounting interfaces 112, 116. In addition, with the channels 142, 166 nested together, the biased locking protrusions 182 may be in an accessible location, from outside of the channels 142, 166 such that each relevant locking protrusion 182 may be moved from its closed position to release the support attachment 106 from the box support 102 (e.g., manually, with a hand tool).

In this way, for example, the resulting nested and interleaved engagement can substantially reduce wobble or other undesired displacement (e.g., rotation) of the support attachment 106 and the box support 102 relative to each other. Thus, for example, the engagement of the support feature 140 and the engagement feature 164 can provide a secure connection between the support attachment 106 and the box support 102, allowing for installation of the box support 102 and the cable support 114 as an integrated system.

In some embodiments, mounting interfaces can be manually separated as well as manually engaged. For example, to remove the support attachment 106 from the box support 102, the outer interface arms 176 can be manually moved to move the biased locking protrusions 182 out of alignment with the wall 148 and thereby allow the support-attachment mounting interface 116 to be moved out of interleaved engagement with the box-support mounting interface 112.

In some embodiments, such as when further stability may be desired, a fastener (not shown) can be inserted into corresponding locking openings 154, 188 on the mounting interfaces 112, 116. The fastener, which can be tightened by hand or using a tool, can further restrict relative movement between the support feature 140 and the engagement feature 164, thereby further helping to prevent disengagement of the mounting interfaces 112, 116. This can be useful, for example, in order to secure a support attachment 106 to a box support 102 for shipping prefabricated assemblies of the box support systems 100.

Figure 19:
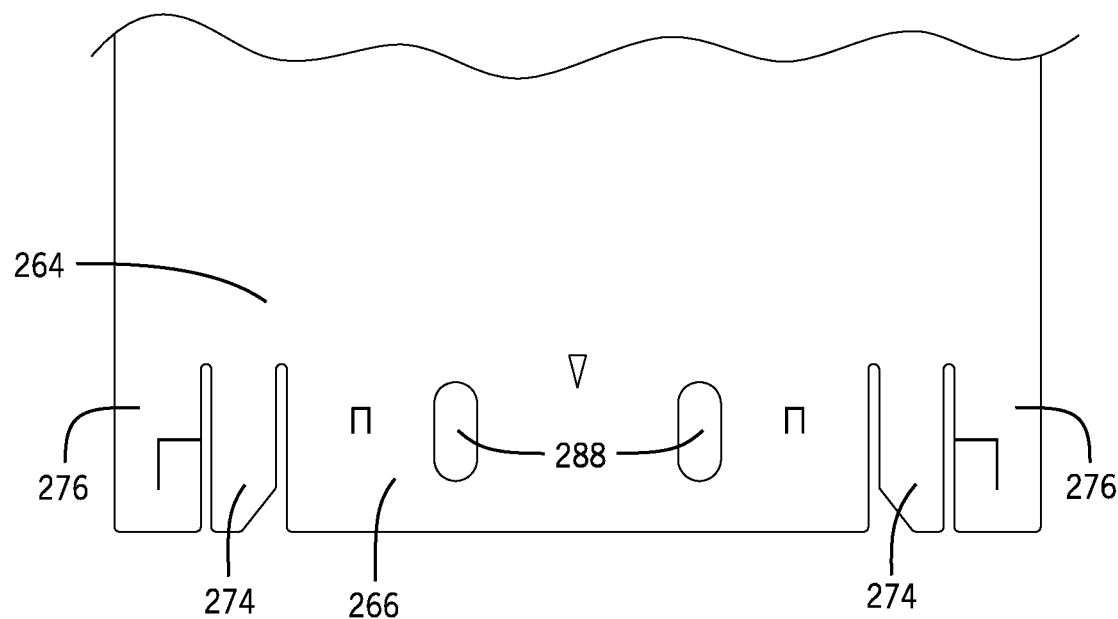
FIG. 19 is a top plan partial view of an embodiment of a mounting interface in the form of a sheet metal blank prior to stamping operations.

In some embodiments, the mounting interface on a support attachment can be formed from a precut sheet metal blank. For example, FIG. 19 illustrates an example of a blank for an engagement feature 264 before the sheet metal has been manipulated (e.g., stamped) into the desired engagement feature configuration. In some configurations, the blank illustrated in FIG. 19 can be formed into a mounting interface that is substantially similar to the mounting interface 116 (see, e.g., FIG. 14), with interface arms formed from portions 274, 276, a channel formed from portion 266, and locking openings formed from portions 288.

Figure 20:
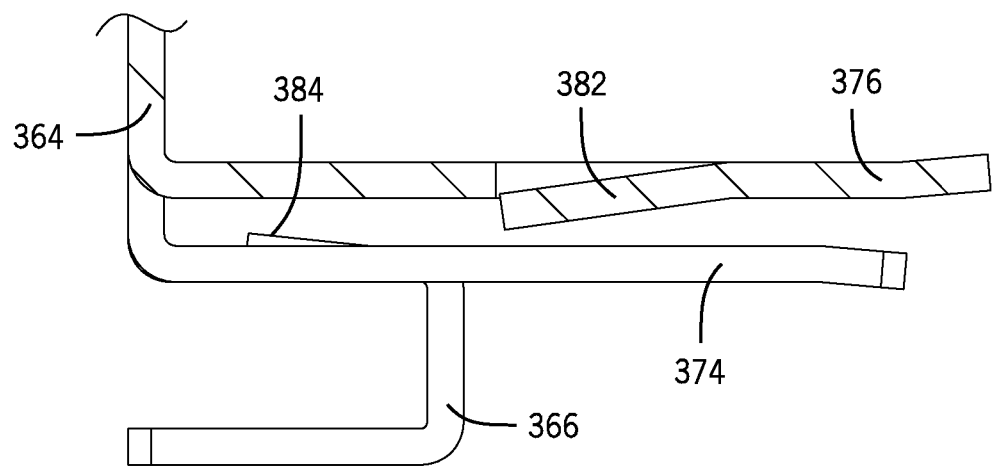
FIG. 20 is a side elevation view of a mounting interface according to another embodiment of the invention.

In some embodiments, the dimensions or other geometric aspects of at least one of the support feature or the engagement feature can be different than those illustrated in any of FIGS. 1-18. For example, as illustrated in FIG. 20, at least one of biased locking protrusions 382, 384 on a support attachment 306 mounting interface 316 can be configured to have a shallower taper angle in their extended positions than the locking protrusions 182, 184 (see, e.g., FIG. 14). This can be useful, for example, when forming the engagement feature 364 from less flexible materials, such as mild steel (e.g., as opposed to heat-treated spring steel). Conversely, at least one biased locking extrusions can be configured to have a larger taper angle than the illustrated embodiments when using more flexible (or other) materials. In other embodiments, the particular configuration of biased locking extrusions can be configured based on other criteria.

In other embodiments, other configurations are possible, including configurations that are substantially reversed from those discussed above. For example, the support feature 140 (or an alternative embodiment thereof) can be provided on at least one support-attachment mounting interface, and the engagement feature 164 (or an alternative embodiment thereof) can be provided on a corresponding box-support mounting interface. Similarly, although some embodiments herein include substantially identical mounting interfaces arrayed along a particular body (e.g., a box support), bodies according to some embodiments can include different configurations of mounting interfaces.

Figure 21:
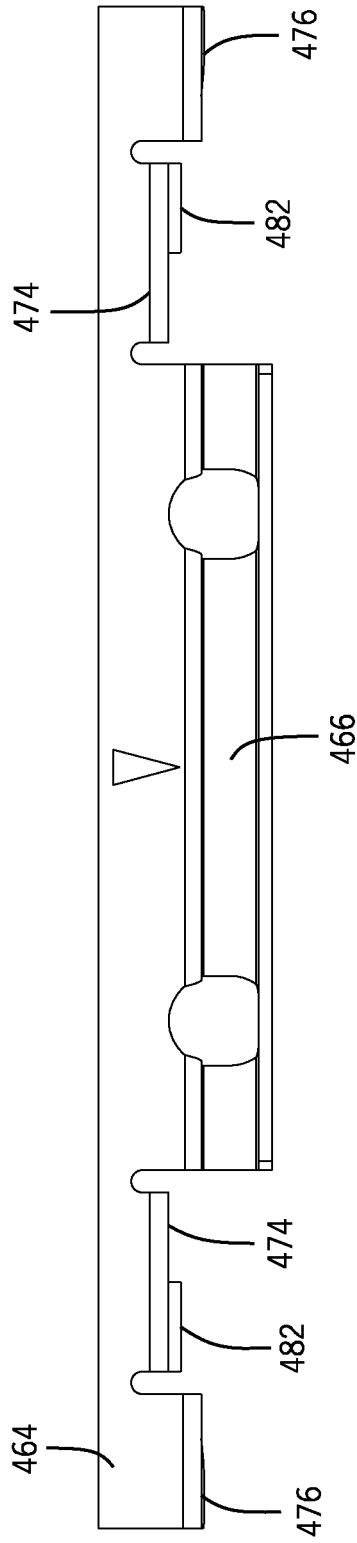
FIG. 21 is a front elevation view of a mounting interface according to another embodiment of the invention.
Figure 22:
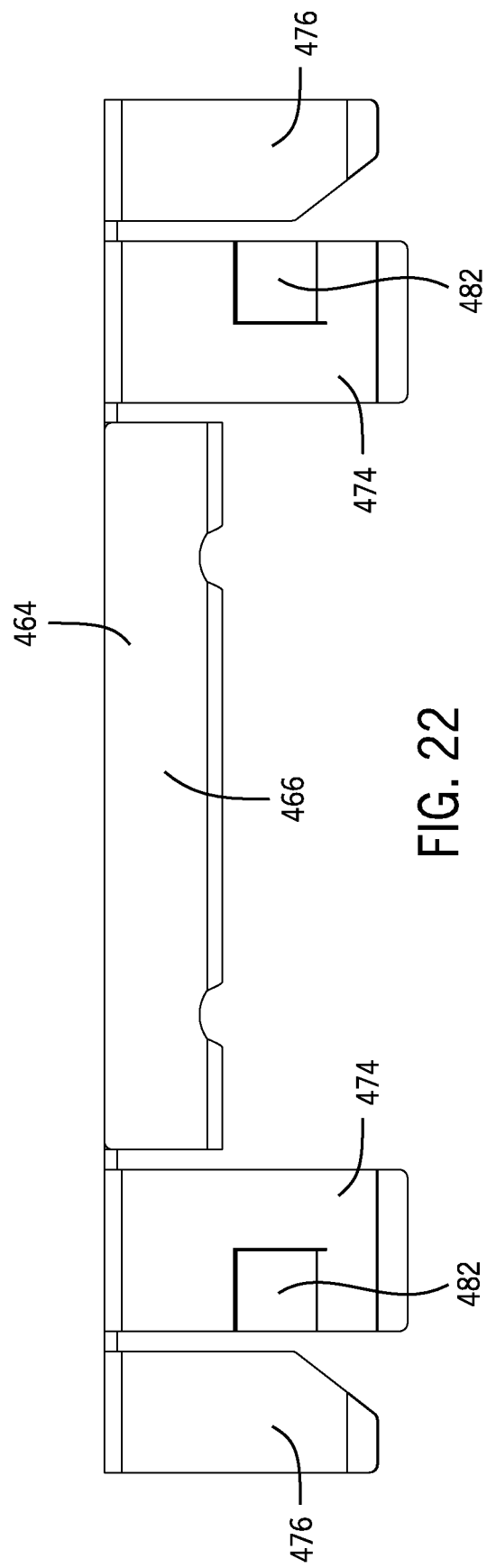
FIG. 22 is a bottom plan view of the mounting interface of FIG. 21.

In some embodiments, the positions of interface arms can be different than discussed above, including configurations that are substantially reversed relative to at least one of the inner interface arms 174 and outer interface arms 176 (see, e.g., FIGS. 15 and 16). As shown in FIGS. 21 and 22, for example, an engagement feature 464 includes inner and outer interface arms 474, 476 that include, respectively, features and spacing similar to those of the outer and inner interface arms 176, 174 illustrated in FIGS. 13-16. In this regard, for example, the engagement feature 464 can be configured to engage a corresponding mounting interface with insertion slots (e.g. similar to the slots 150 of FIGS. 11 and 12) that are aligned to receive the interface arms 476, with the interface arms 476, 474 interleaved on opposite sides of a common feature of the corresponding mounting interface.

As another example, as illustrated in FIGS. 23 and 24, an engagement feature 564 includes inner interface arms 574a, 574b and outer interface arms 576a, 576b that include different features, as compared to the inner and outer interface arms 174, 176 illustrated in FIGS. 13-16. In particular, the interface arms 574b, 576a are configured with similar structure and functional roles as the outer interface arms 176, with biased locking protrusions 582. Likewise, the interface arms 574a, 576b are configured with similar structure and functional roles as the inner interface arms 174. Further, mounting openings 588, a visual alignment indicator 592, or other component can be asymmetrically positioned on the engagement feature 564. Accordingly, for example, the engagement feature 564 can be configured to engage a mounting interface that is correspondingly modified relative to the mounting interfaces 112 (see, e.g., FIGS. 11 and 12).

Figure 25:
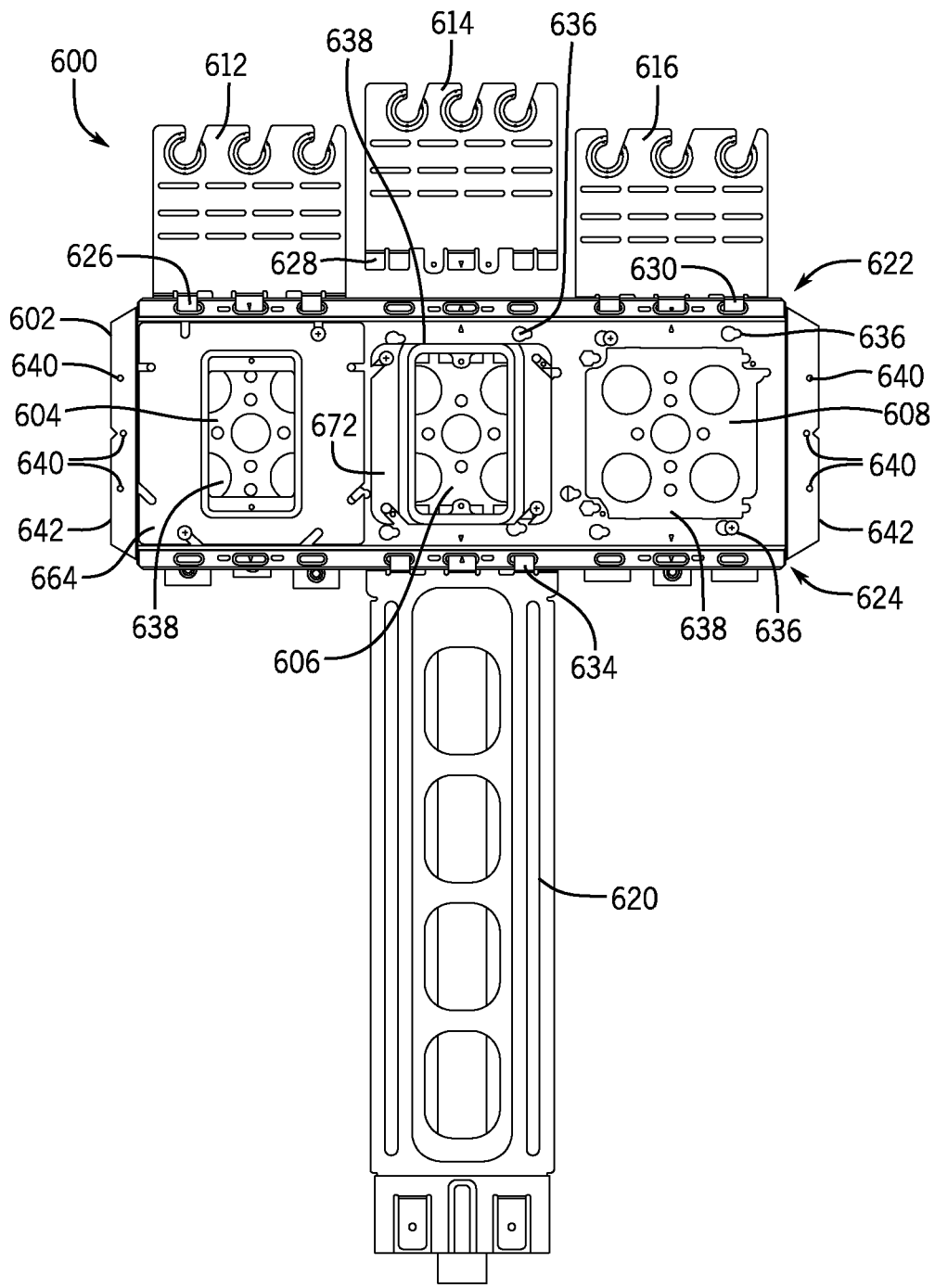
FIG. 25 is a front elevation view of a box support system according to another embodiment of the invention, including a box support, a floor stand, a 5" box mud ring, a 4" box mud ring, and a set of cable supports.

FIG. 25 illustrates an assembly configured as a box support system 600 according to an embodiment of the invention. In the illustrated embodiment, the system 600 includes a box support 602 that is configured to support electrical boxes 604, 606, 608 (or others), a first set of support attachments configured as cable supports 612, 614, 616, and another support attachment configured as a floor stand 620.

The cable supports 612, 614, 616 and the floor stand 620 are configured to be manually engaged with the box support 602. This can be useful, for example, in order to dispose each of the components in an appropriate location for installation during construction. To this end, as also discussed below, the box support 602 includes a set of top mounting interfaces 622, and a set of bottom mounting interfaces 624. Correspondingly, the cable supports 612, 614, 616 each include a corresponding mounting interface 626, 628, 630 and the floor stand 620 includes a mounting interface 634. In the embodiment illustrated, the mounting interfaces 622, 624 are substantially identical to each other, so that the box support 602 can be identically used in the orientation shown or in a reversed orientation. Similarly, the mounting interfaces 626, 628, 630, 634 are also substantially identical to each other, so that the cable supports 612, 614, 616 and the floor stand 620 can be manually and interchangeably attached to any mounting location on any of the mounting interfaces 622, 624 on the box support 602. In other embodiments, other configurations are possible.

As also noted above, the box support 602 is configured to support electrical boxes, such as the electrical boxes 604, 606, 608. In the embodiment illustrated, the electrical boxes 604, 606, 608 are configured as 5", 4", and 4¹¹⁄₁₆" boxes, respectively. In other configurations, other types of boxes can be used. Usefully, the box support 602 includes a number of keyhole openings 636 (only some labeled in FIG. 25) that surround substantially identical cut-outs 638 for the electrical boxes. The configuration and disposition of the keyhole openings 636 can allow electrical boxes of different sizes to be readily attached at the various cut-outs 638. In some embodiments, such as illustrated in FIG. 25, one or more of the keyhole openings 636 can be shaped differently to indicate correspondence with different box sizes. For example, entry portions of the keyhole openings 636 can be round or hexagonal, or otherwise indicated, in order to guide installation of screws for particular sizes of electrical boxes.

A support according to embodiments of the invention can be secured to other structures in different ways. In the embodiments illustrated in FIG. 25, for example, mounting holes 640 are provided on opposite ears 642 of the box support 602. During installation, self-drilling screws can be driven through the mounting holes 640 into underlying studs (or other structures) in order to quickly secure the box support 602 in place. In other embodiments, other configurations are possible.

Figure 26:
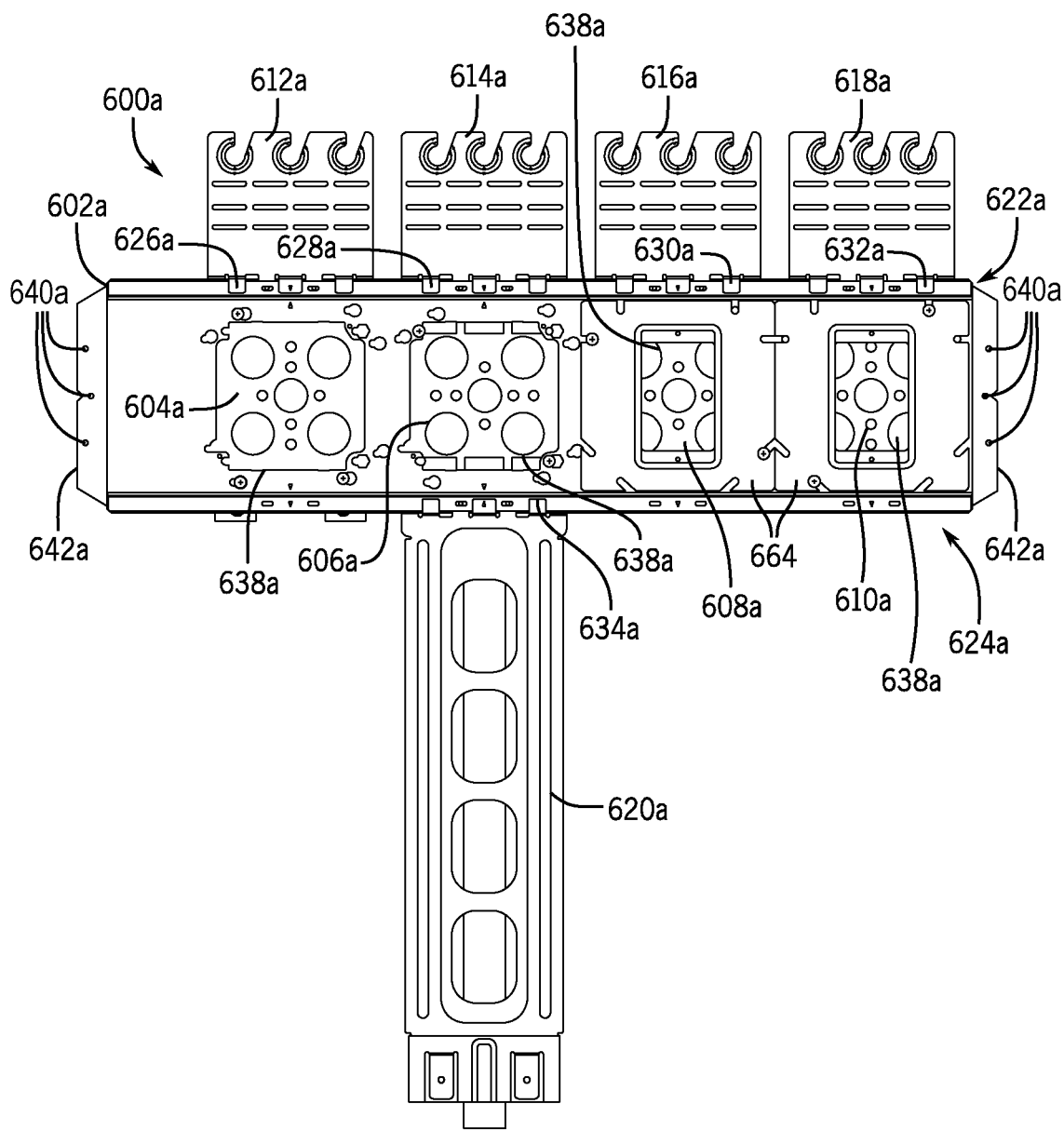
FIG. 26 is a front elevation view of a box support system according to another embodiment of the invention, including a box support, a floor stand, two 5" box mud rings, and a set of cable supports.

FIG. 26 illustrates another assembly configured as a box support system 600a according to another embodiment of the invention. Generally, the box support system 600a is configured similarly to the box support system 600, with reference numbers having an appended "a" indicating similar features as described above for the box support system 600. Unless otherwise stated or required, discussion below relating to the box support system 600, or components thereof, generally applies also to the box support system 600a and components thereof.

Despite the noted similarity, the box support system 600a is different from the box support system 600 in some aspects. For example, the box support system 600 is configured with a 16" length and three of the cut-outs 638, whereas the box support system 600a is configured with a 24" length and four of the cut-outs 638a. Correspondingly, the box support system 600a is configured to support an additional electrical box 610a, and also includes (in the illustrated configuration) an additional cable support 618a with a corresponding mounting interface 632a.

The embodiment of FIG. 26 exhibits additional aspects that demonstrate the versatility of support systems according to the invention. For example, the electrical boxes 604a, 606a, 608, 610a are differently configured than the electrical boxes 604, 606, 608, with measurements of 4¹¹⁄₁₆", 4", 5", and 5", respectively. In other embodiments, other combinations of electrical boxes can be similarly used. Relatedly, whereas the cable supports 612, 614, 616 are configured to support cables or conduits extending from electrical boxes sized as the electrical boxes 604, 606, 608, the cable supports 612a, 614a, 616a 618a are configured to support cables or conduits extending from electrical boxes sized as the electrical boxes 604a, 606a, 608a, 610a. In other embodiments, other configurations are similarly possible.

Figure 27:
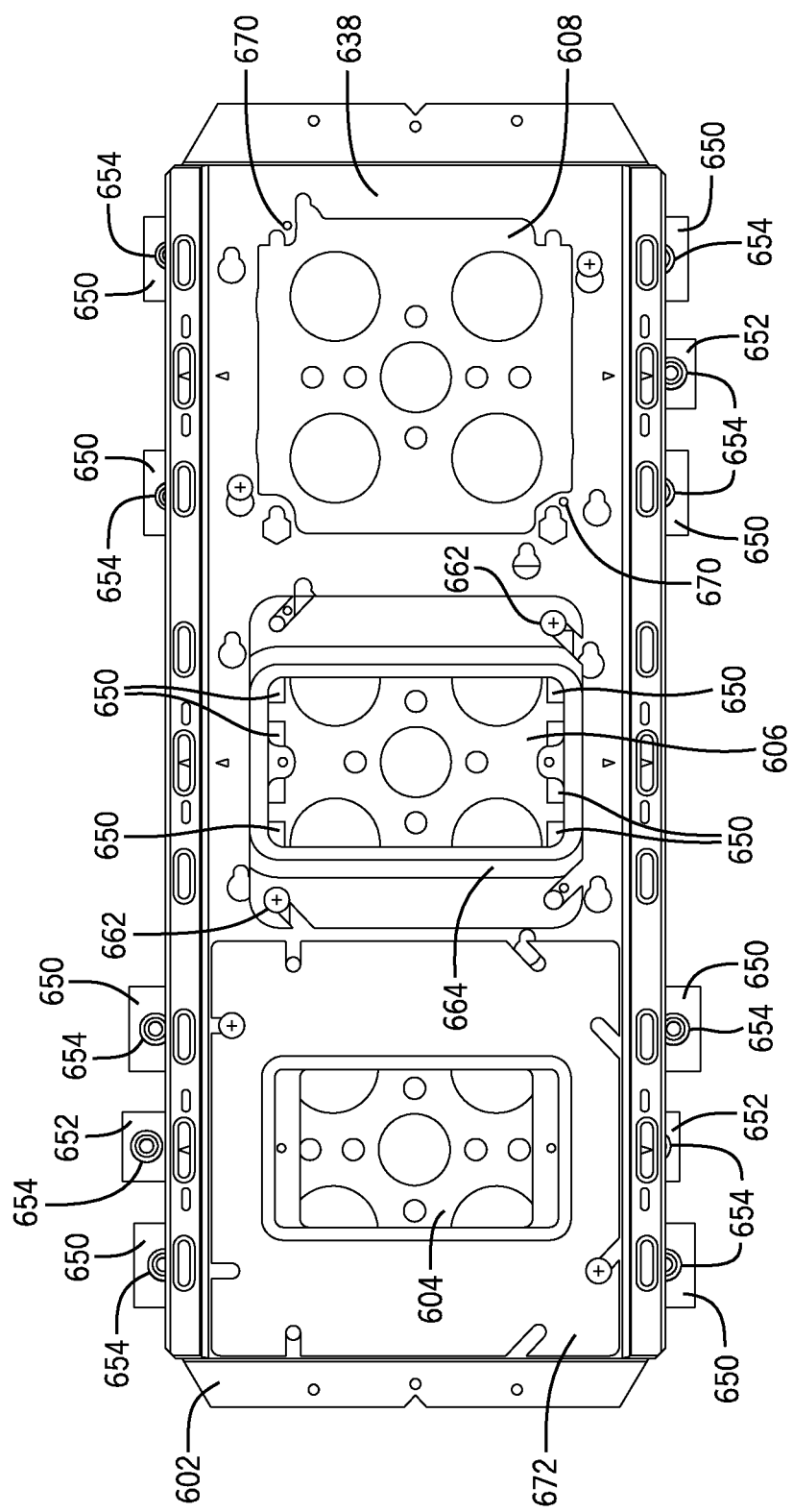
FIG. 27 is a front elevation view of the box support and other components of FIG. 25.

FIG. 27 illustrates the box support 602 of the box support system 600, without the cable supports 612, 614, 616 or floor stand 620 attached thereto. In the illustrated arrangement, as also shown in FIG. 25, each of the electrical boxes 604, 606, 608 includes sets of fittings that can enclose conductors extending into the electrical boxes 604, 606, 608. For example, among many others, ¾" fittings 650 extend from the electrical box 604, and ½" fittings 652 extend from the electrical box 606. Each of the fittings illustrated, including the fittings 650, 652 includes a fitting screw 654 extending from a front side thereof. The electrical boxes 604, 606, 608 can each include the same or a different number of fittings, and can further be symmetrical or non-symmetrical. In another embodiment, electrical boxes could have more fittings, less fittings, or no fittings on the top side, the bottom side, or on both sides.

Figure 28:
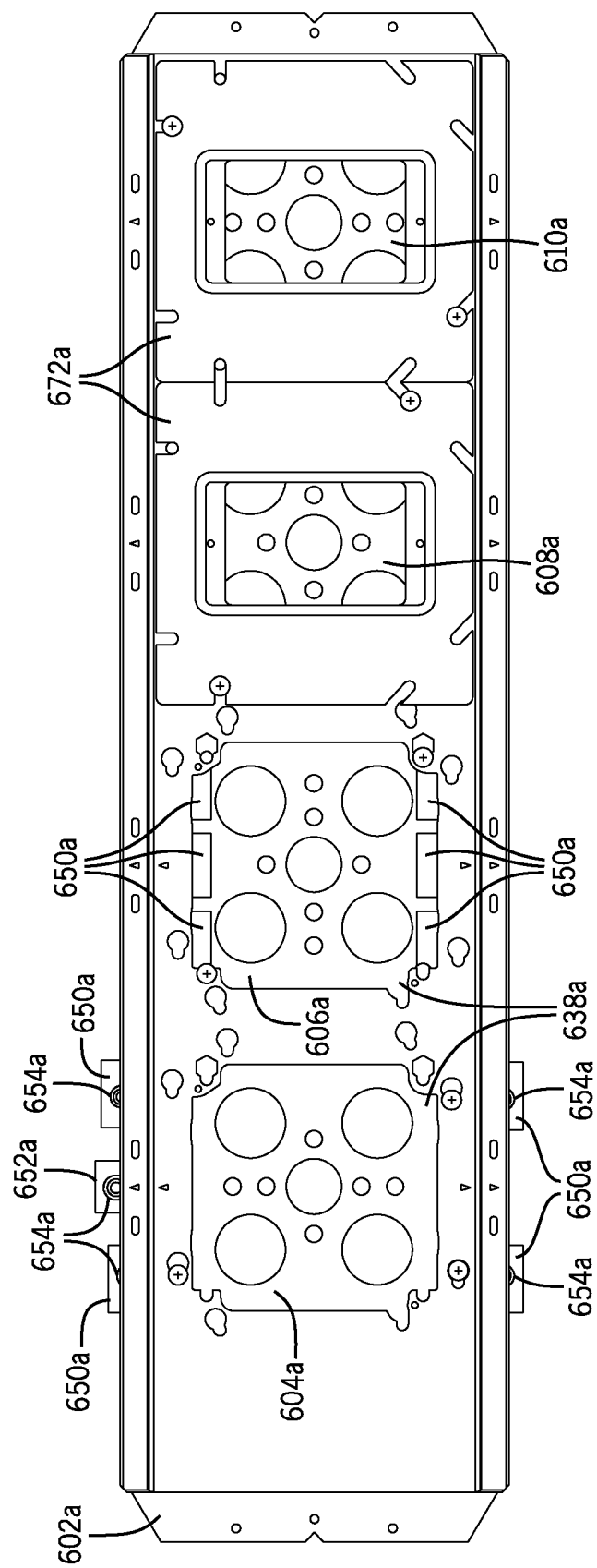
FIG. 28 is a front elevation view of the box support and other components of FIG. 26.

FIG. 28 illustrates the box support 602a of the box support system 600a, without the cable supports, 612a, 614a, 616a, 618a or floor stand 620a attached thereto. As similarly discussed with regard to FIG. 27, electrical boxes 604a, 606a, 608a can each include the same or a different number of fittings, and can be symmetrical or non-symmetrical.

Figure 29:
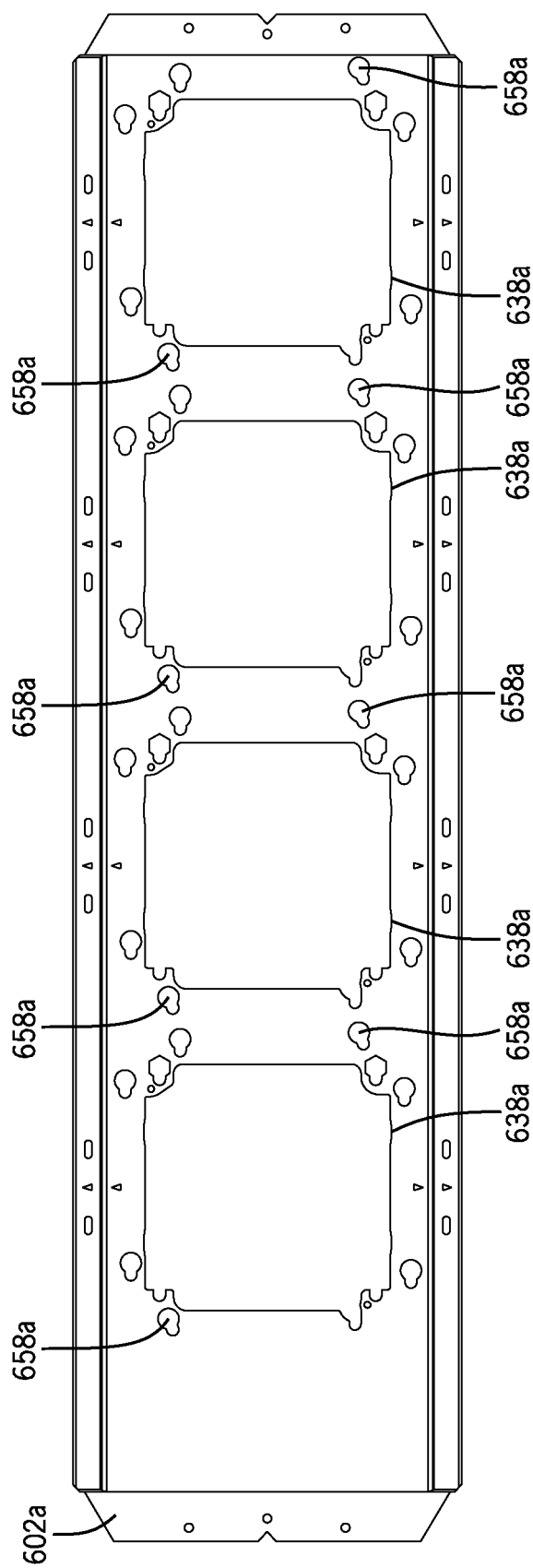
FIG. 29 is a front elevation view of the box support of FIG. 28, without mud rings or electrical boxes.

FIG. 29 illustrates the box support 602a of the box support system 600a, without the cable supports, 612a, 614a, 616a, 618a, floor stand 620a, or electrical boxes 604a, 606a, 608a attached thereto. The box support 602a is configured to include additional space in between adjacent cut-outs 638a, as compared to the box support 602. This can be useful, for example, in order to enhance the rigidity of the box support 602a. In some cases, this can also allow for installation of 5" electrical boxes at each mounting location along the box support 602a. For example, a pitch of 5¹⁄₁₆" for each cut-out 638a can allow use of all 5" electrical boxes as well as installation of 5" mud-rings, without interference (see also, e.g., FIGS. 26 and 28). A relatively wider pitch for the cut-outs 638 can also allow installation of relatively large electrical boxes at any desired orientation of the boxes. This may be useful, for example, in order to accommodate installation of electrical boxes (e.g., 5" electrical boxes) that may have asymmetrical knock-out configurations. For example, in the illustrated embodiment, the relatively large spacing between adjacent cut-outs 638a can allow the box support 602a to include additional keyhole openings 658a that can accommodate adjacent 5" electrical boxes.

Figure 30:
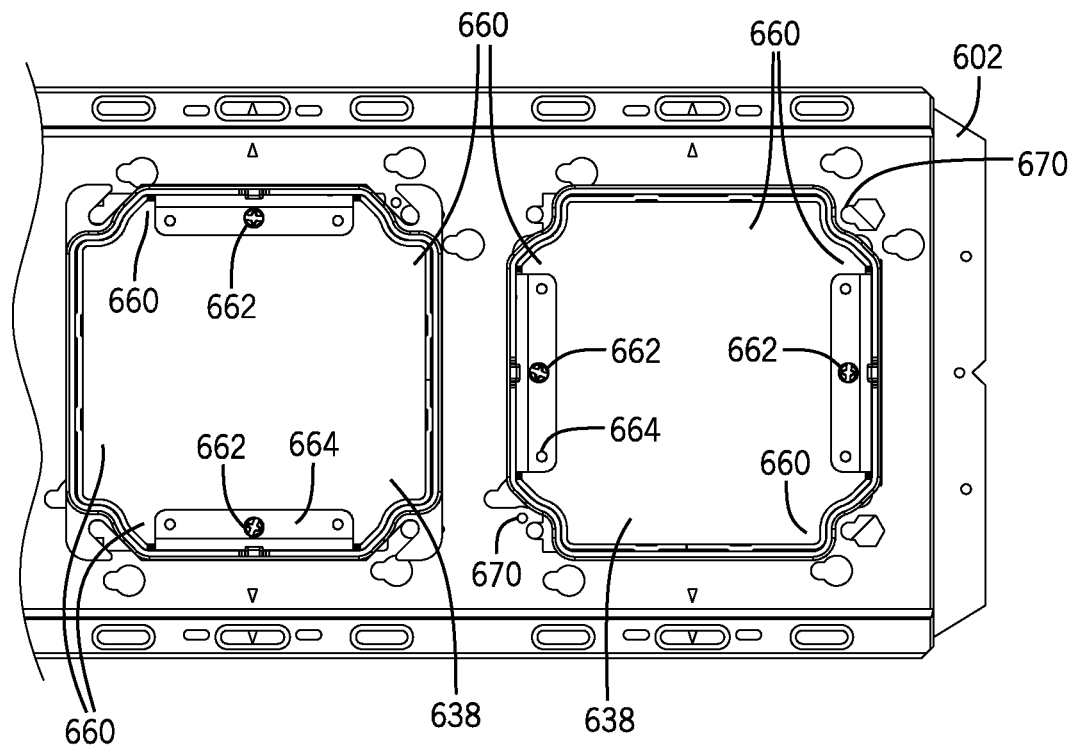
FIG. 30 is a front elevation partial view of the box support of FIG. 27, with adjustable mud rings installed.

In some embodiments, configurations of cut-outs on a box support, such as the cut-outs 638, can allow for functionality other than to mere access to electrical boxes. For example, as illustrated in FIG. 30, lateral, top, and bottom sides of the cut-outs 638 of the box support 602 include extended side portions 660. This may be useful, for example, in order to accommodate fasteners 662 used for adjustment of adjustable mud rings 664. For example, as the fasteners 662 are actuated to adjust the adjustable mud rings 664, the fasteners 662 can readily pass through the extended side portions 660, in order to avoid interference with structures of the box support 602. In the embodiment illustrated, with the extended side portions 660 included on all four sides of the cut-outs 638, the mud rings 664 can be mounted for adjustment in either horizontal (on right in FIG. 30) or vertical (on left in FIG. 30) configurations.

Figure 31:
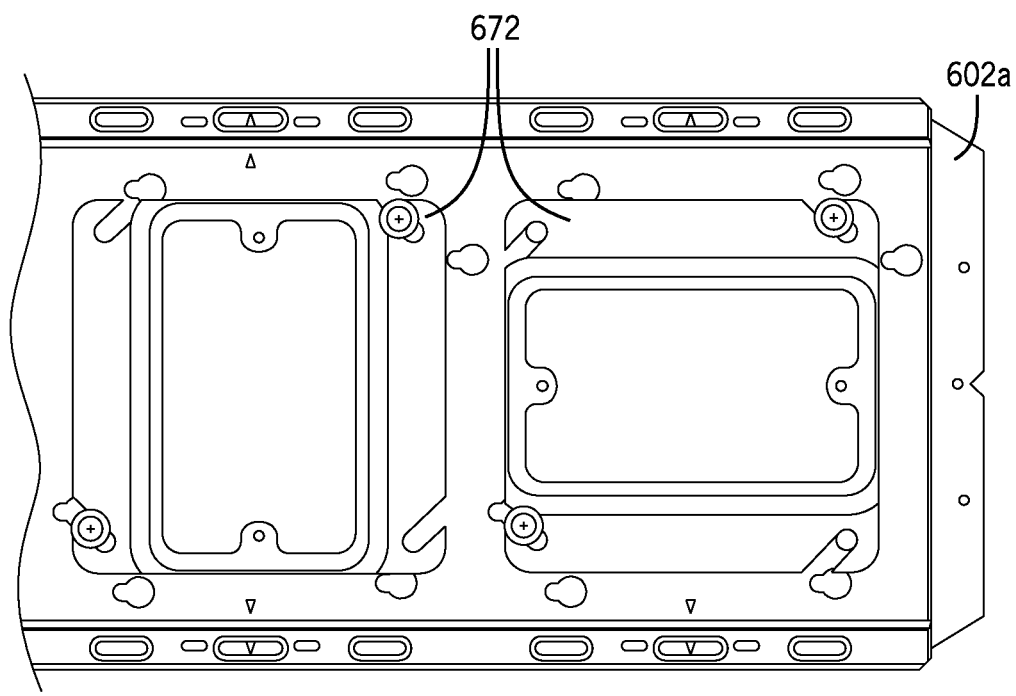
FIG. 31 is a front elevation partial view of the box support of FIG. 28, with mud rings installed.

In some embodiments, mounting openings on a box support can accommodate relatively easy attachment of other components. In one example, the box support 602 includes a set of relatively small mounting holes 670 disposed relatively close to some of the keyhole openings 636 for attachment of electrical boxes (see FIG. 27). Usefully, the mounting holes 670 can receive self-tapping screws in order to attach mud rings 672 in horizontal (on right in FIG. 31) or vertical (on left in FIG. 31) orientations. This may be appropriate, for example, for low voltage applications in which electrical boxes may not necessarily also be used.

Figure 35:
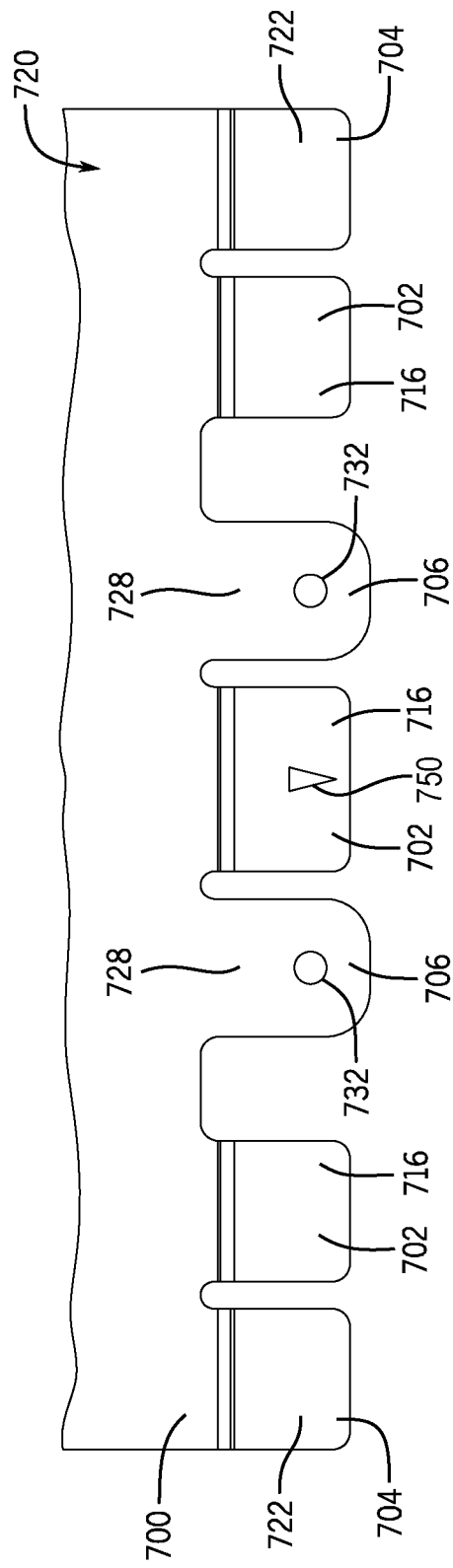
FIG. 35 is a front elevation view of a mounting interface of one of the cable supports of FIG. 25, for use with the mounting interface of FIG. 33.

As also discussed above, embodiments of the box support can include box-support mounting interfaces that can allow for manual, secure, and somewhat interchangeable attachment of different support attachments. An example configuration for the top mounting interface 622 of the box support 602 is illustrated in FIGS. 33, 34, and 35. In the illustrated embodiment, a substantially identical configuration can be used for the bottom mounting interfaces 624. Alternatively, some embodiments can use different top or bottom mounting interfaces. In some embodiments, a similar or substantially identical configuration can be used for other supports according to embodiments of the invention.

As illustrated in FIG. 32, each of the top and bottom mounting interfaces 622, 624 collectively include a support feature 680 configured as a C-shaped channel and including a first side wall 682, a second side wall 684 opposite the first side wall 682, and a first support surface 686 extending generally horizontally between the upper ends of the first and second side walls 682, 684. The first side wall 682 and second side wall 684 are substantially parallel with a mounting face 688 of the box support 602 to which the electrical boxes 604, 606, 608 can be secured.

In the illustrated embodiment, the support features 680 of each of the top mounting interfaces 622 (and the bottom mounting interfaces 624) are linked in a single continuous structure that extends along the entire length of the top of the box support 602, thereby providing relatively significant rigidity and strength. For example, the geometry of the support feature 680 (and the C-shaped channel of the support feature 680) can provide relatively high stiffness for bending and torsional moments, so that the box support 602 is resistant to twisting and other deformation (e.g., bending). In the illustrated embodiment, the first side wall 682, the second side wall 684, and the first support surface 686 are integrally formed in the box support 602. In other embodiments, other configurations are possible.

In some embodiments, at least one of the support features 680 can be configured in alternative shapes or structures (e.g. V-shaped channels, etc.) that can also provide structural stability to the box support 602. Further, the support feature 680 can be formed from multiple discontinuous features in some embodiments.

In some embodiments, other features and aspects can be provided to assist in securing support features to the box support at mounting interfaces, as well as to provide other useful functionality. In the embodiment illustrated, for example, each of the mounting interfaces 622, 624 includes a set of locking openings 690. In the embodiment illustrated, each of the locking openings 690 is configured as a horizontal slot that extends fully through the first side wall 682, although other configurations are possible. Further, each of the mounting interfaces 622, 624 also includes two insertion slots 692 that are configured to receive a portion of a corresponding support attachment. In the embodiment illustrated, each of the insertion slots 692 extends through the first support surface 686, generally adjacent to the first side wall 682. Further, each of the locking openings 690 is generally positioned in vertical alignment with a corresponding one of the insertion slots 692.

In some embodiments, other features can be included on the box support 602. For example, as illustrated in FIGS. 32 and 33 in particular, the box support 602 includes an integrally formed channel 694 that extends across the entire lateral length of the box support 602 (other than the ears at the opposing ends thereof). In some embodiments, the channel 694 can provide further structural reinforcement for the box support 602, including with regard to resistance to bending, with the horizontal orientation of the channel 694 allowing for easy installation of electrical boxes of different sizes.

In other embodiments, other configurations of the mounting interfaces 622, 624 are possible. For example, in some embodiments, the locking openings 690 can be collectively formed as a single, continuous opening. Similarly, in some embodiments, one of the locking openings 690 can be formed as a single, continuous opening with at least one locking opening 690 of an adjacent one of the mounting interfaces 622, 624. In some embodiments, the locking opening 690 can be provided on a different part of the mounting interfaces 622, 624, such as the second side wall 684, or can exhibit a different geometry than illustrated in the FIGS. In some embodiments, insertion slots can be disposed generally adjacent to the second side wall 684, or may not be aligned with a corresponding set of locking openings. Similarly, in some embodiments, locking openings can be formed in the second side wall 684, or can be formed as indents into a relevant feature, rather than extending fully therethrough.

Figure 36:
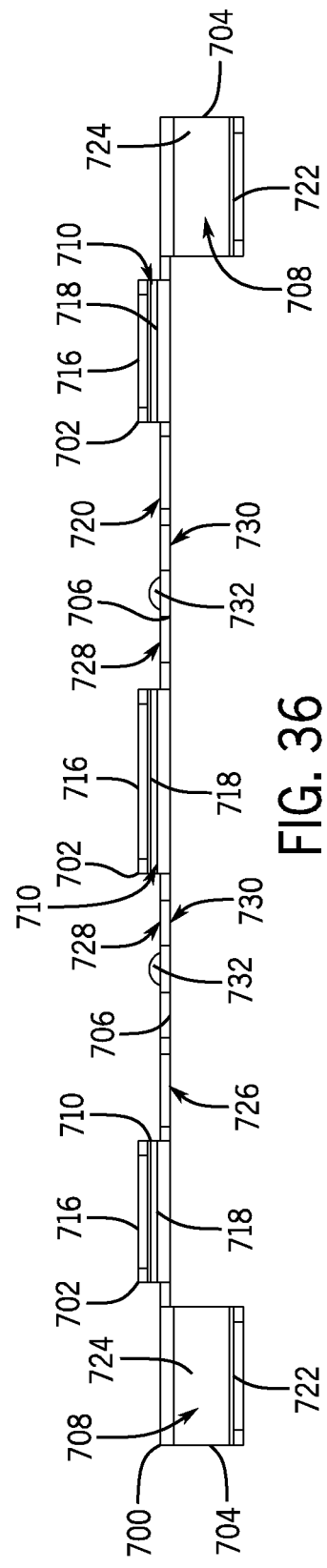
FIG. 36 is a bottom plan view of the mounting interface of FIG. 35.

In some embodiments, the support attachments can include a support-attachment mounting interface that is generally complimentary to the configuration of the box-support mounting interface as discussed above. FIGS. 35-37 illustrate an example configuration for the mounting interface 628 of the cable support 614 that is generally complimentary to the configuration of the top mounting interface 622. In some embodiments, a substantially identical configuration can be used for other attachment mounting interfaces, such as the mounting interfaces 626, 630, 634 illustrated in FIG. 25 or the mounting interfaces 626a, 628a, 630a, 632a, 634a illustrated in FIG. 26. In this way, for example, any of these mounting interfaces can interchangeably engage any one of the top or bottom mounting interfaces 622, 624. In other embodiments, other mounting interfaces with other engagement features can be used on other supports (e.g., other attachments). In some embodiments, multiple mounting interfaces can be included on a single support attachment.

In the embodiment illustrated, the mounting interface 628 includes an engagement feature 700 that is generally complimentary to the support feature 680 on the corresponding top mounting interface 622 (see, e.g., FIGS. 32-34). Also as illustrated, the engagement feature 700 includes multiple distinct types of interface features. For example, each of the engagement features 700 includes first interface arms 702, second interface arms 704, insertion tabs 706, a second support surface 708 and a third support surface 710. As discussed in further detail below, the first and second interface arms 702, 704 are configured for interleaved engagement with the corresponding support feature 680, at the first and second side walls 682, 684, respectively, the insertion tabs 706 are configured to be inserted into the corresponding insertion slots 692, and the second and third support surfaces 708, 710 are configured to engage the corresponding first support surface 686. In other embodiments, other configurations are possible.

In the illustrated embodiment, the engagement feature 700 includes three first interface arms 702 and two second interface arms 704. The second interface arms 704 are positioned proximate opposite, lateral ends of the engagement feature 700. The first interface arms 702 are positioned along the lateral length of the engagement feature 700 between the two interface arms 704, with a respective one of the first interface arms 702 being positioned proximate each of the second interface arms 704 and a wider one of the first interface arms 702 being positioned at a generally central position of the lateral length of the engagement feature 700, between the insertion tabs 706.

In the embodiment illustrated, each of the first interface arms 702 includes a first vertical section 716 and a first horizontal section 718 (see FIG. 36) extending between the first vertical section 716 and a first face 720 of the cable support 614. Similarly, the second interface arm 704 includes a second vertical section 722 and a second horizontal section 724 (see FIG. 36) extending between the second vertical section 722 and a second face 726 of the cable support 614 that is opposite the first face 720. Each of the first and second horizontal surfaces 718, 724 are generally perpendicular to the first and second faces 720, 726 of the cable support 614, and each of the first and second vertical surfaces 716, 722 are generally parallel to the first and second faces 720, 726 and protrude downwardly from the first and second vertical surfaces 716, 722, respectively.

In the illustrated embodiment, the first horizontal sections 718 extend a greater distance from the first face 720 of the cable support 614 than the second horizontal sections 724 extend from the second face 726 of the cable support 614. More particularly, the first and second horizontal sections 718, 724 are dimensioned so that, when the engagement feature 700 is engaging the support feature 680 (as described in further detail below), the first and second vertical sections 716, 722 abut the first and second side walls 682, 684, respectively, and the first face 720 is substantially aligned (e.g., generally coplanar) with the mounting face 688 (see, e.g., FIGS. 32 and 40).

In other embodiments, the first and second horizontal sections 718, 724 may have other configurations. For example, the first and second horizontal sections 718, 724 can be dimensioned so that the first horizontal section 718 is longer than the second horizontal section 724, and so the second face 726 is generally coplanar with the mounting face 688.

Other embodiments of the engagement feature can be configured with different angular relationships between various sections 716, 718, 722, 724 of the interface arms 702, 704 and the faces 720, 726 of said engagement feature 700. Further, some embodiments can include additional first or second interface arms 702, 704, fewer first or second interface arms 702, 704, or the same number of first or second interface arms 702, 704 as the illustrated embodiment. Some embodiments can be configured with alternative positions for at least one of the first or second interface arms 702, 704. In some embodiments, at least two first interface arms 702 or at least two second interface arms 704 can be formed by a single continuous feature. In some embodiments, other, differently configured interface arms can be used.

Generally, support surfaces on complementary mounting interfaces can be engaged to block movement of the associated supports in a particular direction. In different embodiments, support surfaces, such as the second support surface 708 and the third support surface 710, can be provided by different portions of an engagement feature, such as the engagement feature 700. In the embodiment illustrated in FIGS. 35-37, for example, the second support surface 708 is provided by the lower portion of the second horizontal sections 724 of the interface arms 704, and the third support surface 710 is provided by the lower portion of the first horizontal sections 718 of the interface arms 702. In another embodiment, the second and third support surfaces 708, 710 can be provided by alternative portions of the engagement feature 700, or an additional structure not illustrated herein.

With continued reference to FIGS. 35-37, the illustrated embodiment of the engagement feature 700 includes two of the insertion tabs 706, positioned on either side of the central first interface arm 702. The position of each of the insertion tabs 706 corresponds to the position of a corresponding insertion slot 692 on the support feature 680. Further, the insertion tabs 706 are substantially in-line with the body of the cable support 614, so that a first face 728 and a second face 730 of each insertion tab 706 is generally coplanar with the first face 720 and second face 726 of the cable support 614, and each extend downwardly therefrom. This may be useful, for example, to provide relatively substantial rigidity to the cable support 614 overall, when secured to a box support using the engagement feature 700.

In some embodiments, the engagement feature 700 can include more insertion tabs 706 or fewer insertion tabs 706 than the illustrated embodiment. The insertion tabs 706 can also have alternative positions along the lateral length of the engagement feature 700 and can be out of alignment with the body of the cable support 614.

In some embodiments, a locking feature can be included to oppose movement opposite to the movement opposed by the engagement of support surfaces (e.g., as described above). In the embodiment illustrated, for example, the engagement feature 700 includes multiple locking protrusions 732 protruding from the insertion tab 706. In other embodiments, a similar or other locking protrusion can alternatively (or additionally) be included on the first interface arm 702, the second interface arm 704, or another portion of the engagement feature 700.

In the illustrated embodiment, the first face 728 of each insertion tab 706 includes a locking protrusion 732 extending therefrom. Each locking protrusion 732 corresponds to a corresponding one of the locking openings 690 on the support feature 680 (see, e.g., FIG. 33) and is configured to engage said locking opening 690 when the insertion tab 706 is inserted into the corresponding insertion slot 692. In embodiments for which a differently configured locking protrusion is provided, a locking opening on the support feature 680 can be correspondingly different than the locking openings 690.

In other embodiments, at least one locking protrusion can be coupled to alternative portions of an engagement feature. For example, in some embodiments, at least one of the first interface arms 702 can include a locking protrusion 644 configured to engage a locking opening 690 formed in the first support wall 682. Further at least one of the second interface arms 704 can include a locking protrusion 644 configured to engage a locking opening 690 formed in the second side wall 684. The locking protrusion 732 can also protrude from at least one of the first face 720 or the second face 726 of the engagement feature 700.

In some embodiments, a locking protrusion can be formed on a mounting interface similar to the mounting interfaces 622, 624 and a locking opening can be formed on a mounting interface similar to the mounting interfaces 630, 634, etc. In some embodiments, locking protrusions and openings can be formed on particular mounting interfaces, including mounting interfaces similar to those expressly described above.

Figure 38:
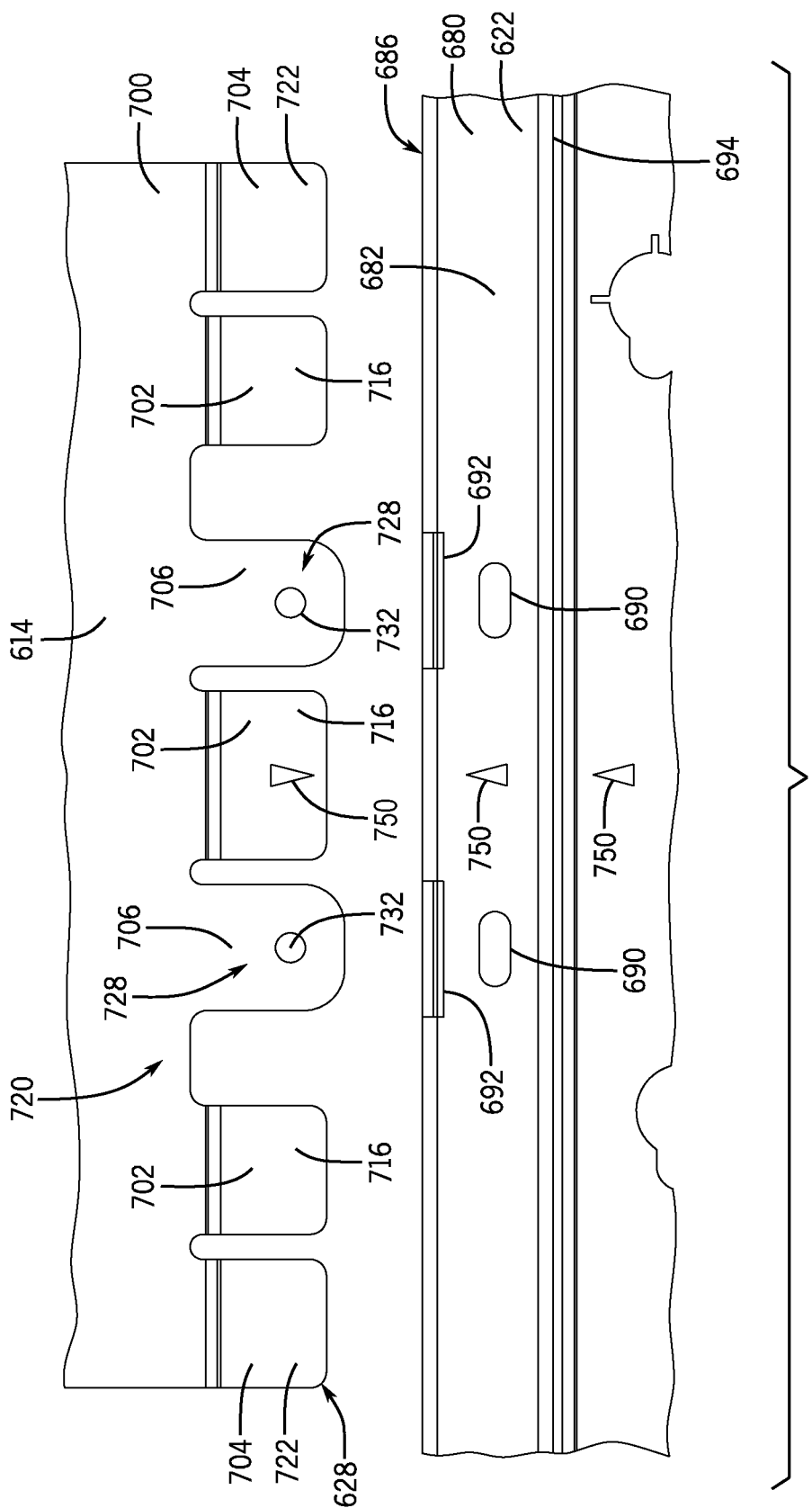
FIGS. 38 and 39 are front elevation views illustrating installation of the mounting interface of FIG. 33 onto the mounting interface of FIG. 35, during assembly of the box support system of FIG. 25.
Figure 39:
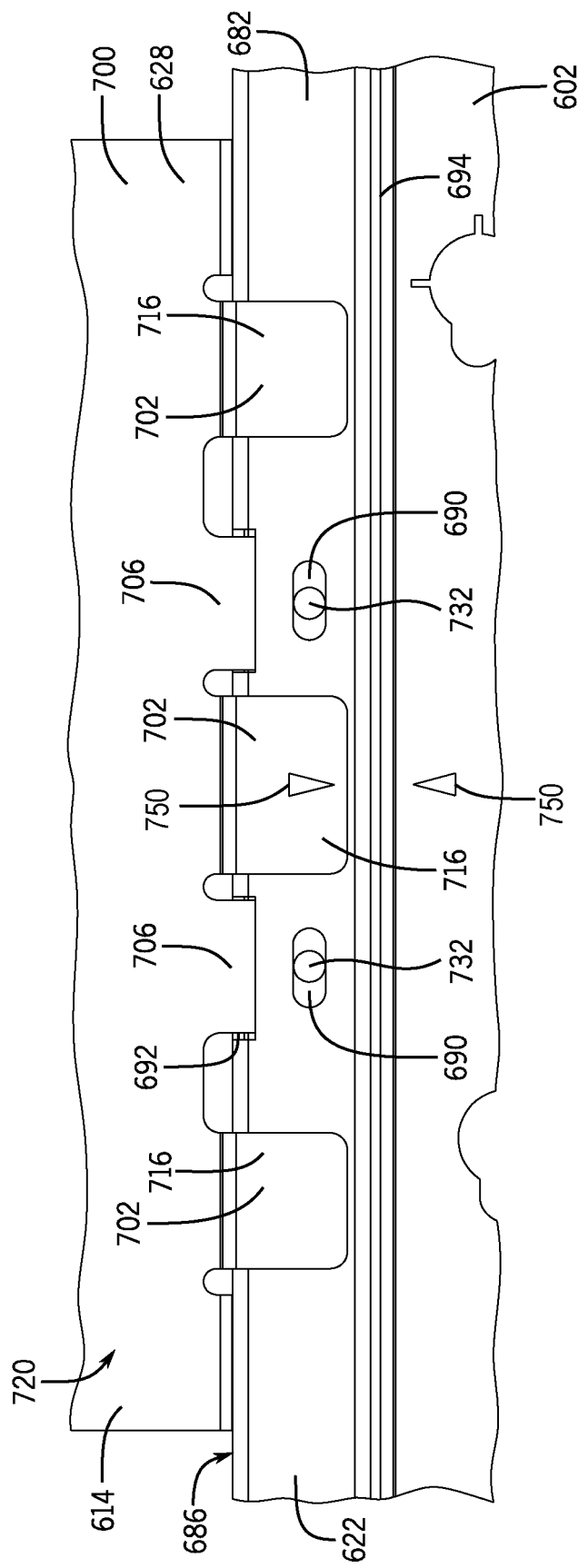
Figure 40:
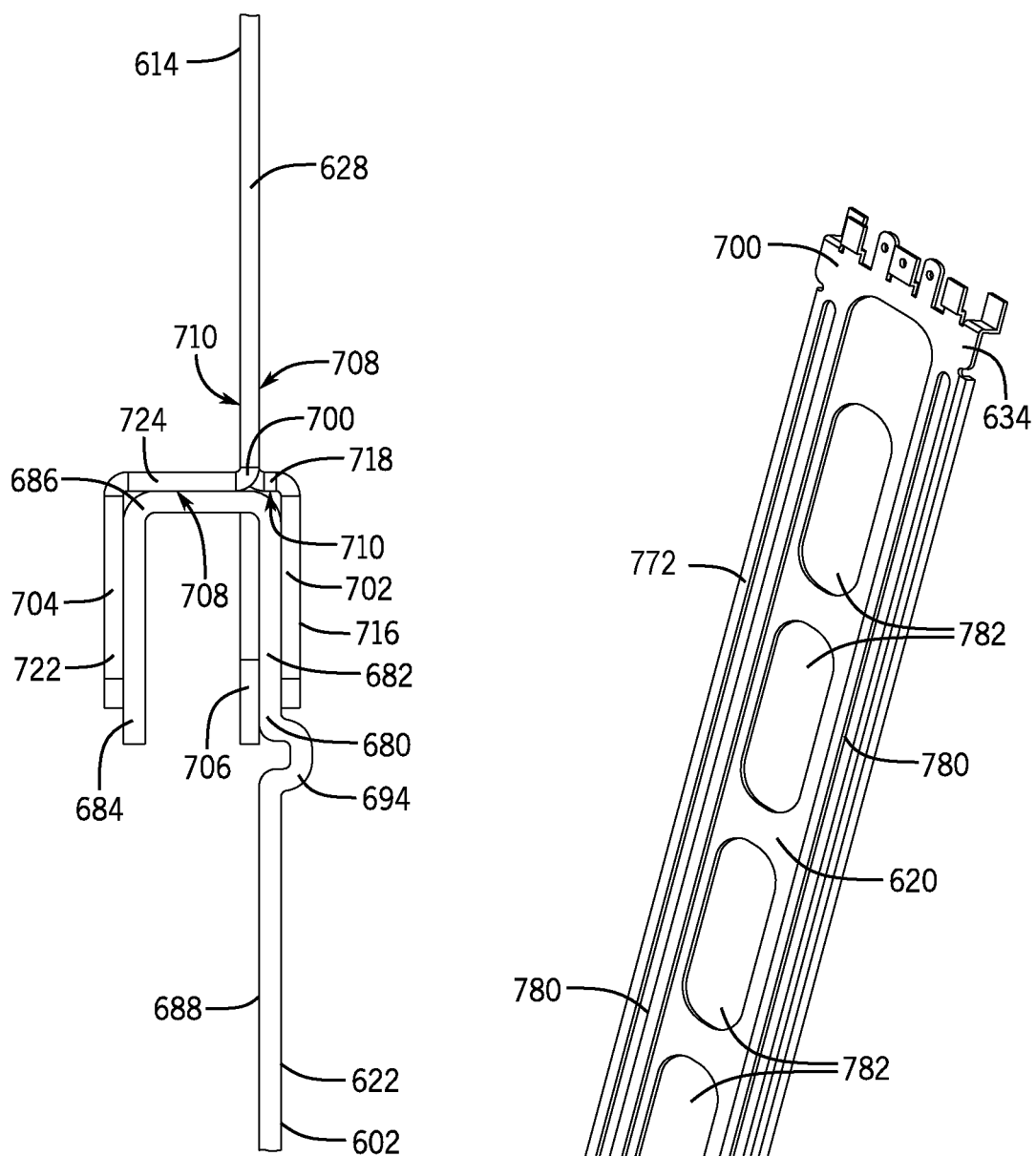
FIG. 40 is a side elevation view, respectively, of the mounting interfaces of FIGS. 33 and 35 secured together after assembly of the box support system of FIG. 25.

FIGS. 38-40 illustrate an example process of manually engaging the engagement features 700 of the mounting interface 628 with the support features 680 of the top mounting interface 622 in order to securely attach the cable support 614 to the box support 602 without requiring the use of tools. In some embodiments, a floor stand, such as the floor stand 620, or another support, can be similarly secured to a support such as the box support 602 in the same, or a similar, manner.

As illustrated in FIG. 38, to secure the cable support 614 to the box support 602, the respective mounting interfaces 622, 628 can first be generally aligned with each other. In some embodiments, visual alignment of the insertion slot 692 and the insertion tab 706 can assist in this regard. In some embodiments, for example, a visual alignment indicator 750 disposed on at least one of the cable support 614 or the box support 602 can be used to aid in alignment.

Once the mounting interfaces 622, 628 are appropriately aligned, the cable support 614 can be moved (e.g., translated) into physical engagement with the box support 602 (or vice versa). With appropriate alignment, this can cause the engagement feature 700 to engage in interleaved contact with the support feature 680 in order to provide a relatively stable connection between the cable support 614 and the box support 602.

For example, in the embodiment illustrated in FIGS. 39 and 40, the second support surface 708 and the third support surface 710 (see FIG. 40) engage the first support surface 686 to oppose vertically downward local movement of the cable support 614 relative to the box support 602. The first vertical sections 716 of the first interface arms 702 engage the outwardly facing side of the first side wall 682. Similarly, the second vertical sections 722 of the second interface arms 704 engage the outwardly facing side of the second side wall 684. Engagement of the first and second side walls 682, 684 by the first and second vertical sections 716, 722, respectively, opposes horizontal local movement of the cable support 614 relative to the box support 602.

Further, the insertion tab 706 is received by the insertion slot 692 and generally engages an inwardly facing side of the first side wall 682 opposite the outwardly facing side, thereby further opposing horizontal local movement of the engagement feature 700 relative to the support feature 680. When the insertion tab 706 is inserted into the insertion slot 692, the locking protrusion 732 extends into the locking opening 690, thereby securing the cable support 614 to the box support 602 and opposing at least upward vertical motion of the cable support 614 relative to the box support 602.

In this way, an interleaved engagement is obtained, substantially reducing wobble or other undesired displacement (e.g., rotation) of the cable support 614 and the box support 602 relative to each other. The engagement of the support feature 680 and the engagement feature 700 provides a secure connection between the cable support 614 and the box support 602, allowing for installation of the box support 602 and the cable support 614 as an integrated system. As also noted above, similar support and engagement features 680, 700 on the mounting interfaces 622, 624, 626, 628, 630, 634 can allow for box support system 600 to be readily manually assembled (see, e.g., FIG. 25) for integrated installation.

In other embodiments, other configurations are possible. For example, the support feature 680 (or an alternative embodiment thereof) can be provided on at least one support-attachment mounting interface, and the engagement feature 700 (or an alternative embodiment thereof) can be provided on the corresponding box-support mounting interface. Similarly, although embodiments herein include substantially identical mounting interfaces arrayed along a particular body (e.g., box support), bodies according to some embodiments can include different configurations of mounting interfaces.

Figure 41:
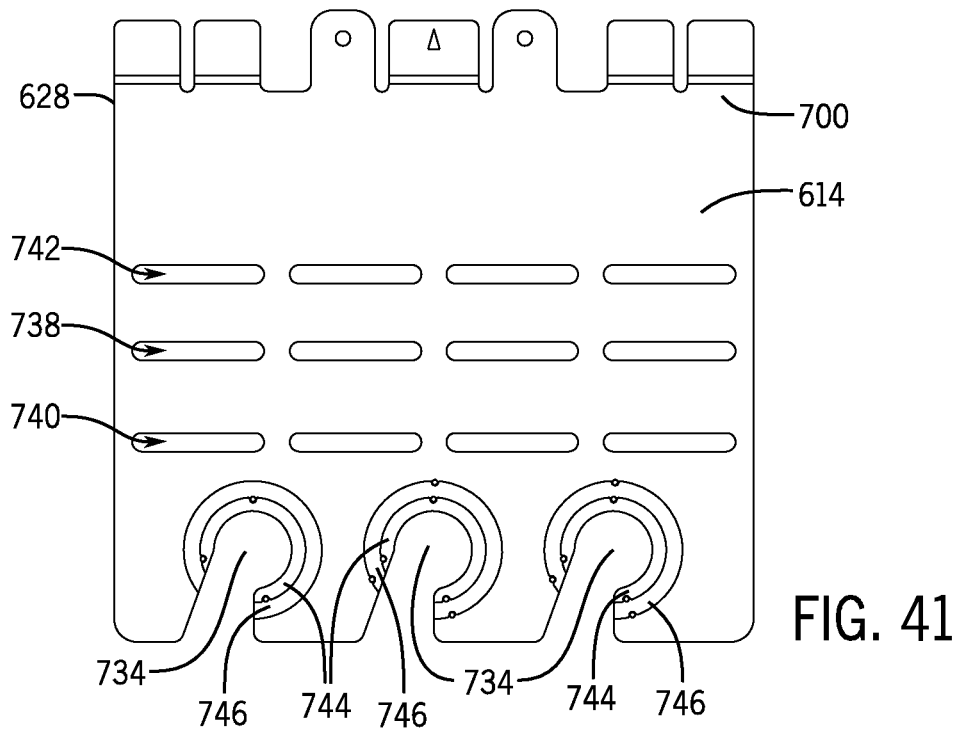
FIGS. 41 and 42 are front elevation views of cable supports for use with the box support systems of FIGS. 25 and 26.
Figure 42:
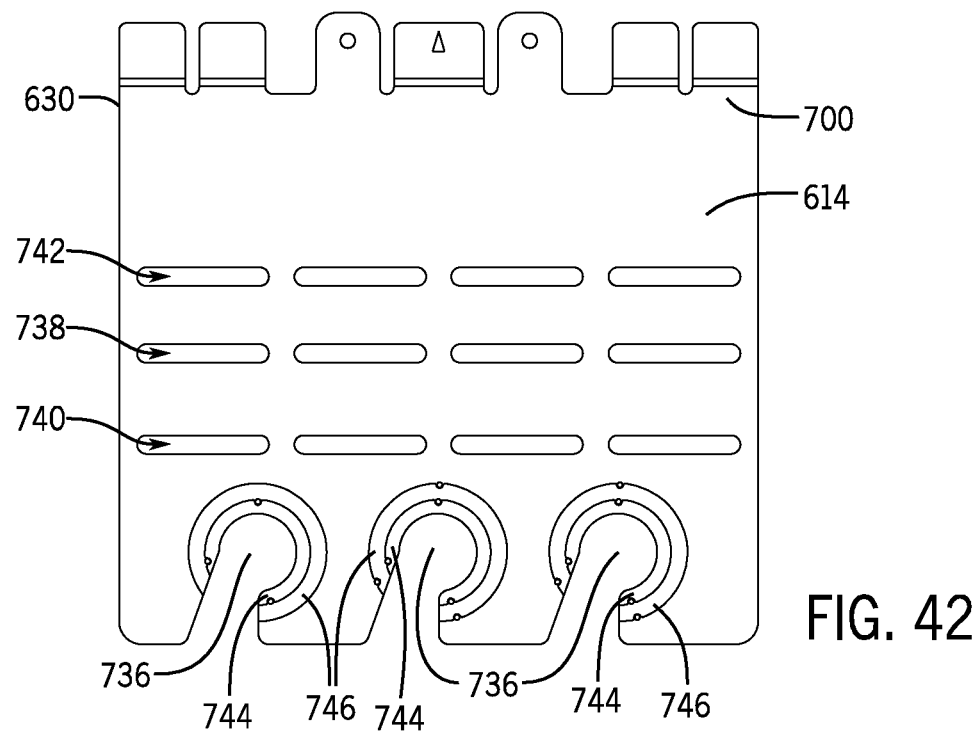

FIGS. 41 and 42 illustrate example configurations of the cable supports 614 and 616, respectively. Generally, each of the cable supports 614, 616 includes a similar configuration for the associated mounting interfaces 628, 630. As such, for example, the cable supports 614, 616 can be securely and interchangeably engaged with the box support 602 (or other supports) in alignment with an appropriate electrical box.

In some embodiments, it may be useful for cable supports to exhibit different arrangements depending on the size of electrical box with which the cable supports are to be used. In the embodiment illustrated, for example, the cable support 614 is configured for use with 4" electrical boxes and the cable support 616 is configured for use with 4¹¹⁄₁₆" and 5" electrical boxes. In this regard, for example, a spacing of 2.45" can be provided between outer cable openings 734 on the cable support 614 and a spacing of 2.9" can be provided between outer cable openings 736 on the cable support 616. Each of the cable supports 614, 616 is configured to be bent at perforated bend lines 738, 740 for use with 2⅛", 1½" electrical box heights, and at perforated bend line 742 for use with a 2⅞" electrical box height.

Generally, cable supports according to embodiments of the invention can be configured to accommodate a variety of components, including cables, conduits, and other components configured to enclose electrical conductors. For example, each of the cable openings 734, 736 is generally configured to accommodate MC/AC cable, as needed. Further, each of the cable openings 734, 736 on the cable supports 614, 616 include punch-outs 744, 746 in order to accommodate ½" and ¾" conduit, respectively.

Figure 43:
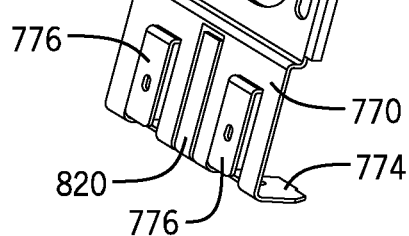
FIG. 43 is an isometric view of a floor stand for use with the cable support systems of FIGS. 25 and 26.

In some embodiments, a support attachment for a box support system can include a floor stand that can be used to secure a box support at a particular height relative to the ground. An example configuration for the floor stand 620 is illustrated in detail in FIGS. 43-45. Generally, the floor stand 620 includes a base portion 770, the mounting interface 634, and an extension portion 772 extending upward from the base portion 770 to the mounting interface 634.

In the embodiment illustrated, the mounting interface 634 includes engagement feature 700, and is configured to engage a bottom mounting interface 624 as described in detail above. The bottom end of the base portion 770 includes a foot flange 774 for footed support of the floor stand 620, as well as clasping tabs 776 configured for interleaved engagement of a floor structure (e.g., a metal floor stud). The extension portion 772 includes two vertical channels 780 configured to provide structural reinforcement to the floor stand 620. The extension also includes four cutouts 782 spaced along the vertical length of the extension portion and extending therethrough. In other embodiments, other configurations are possible.

Figure 44:
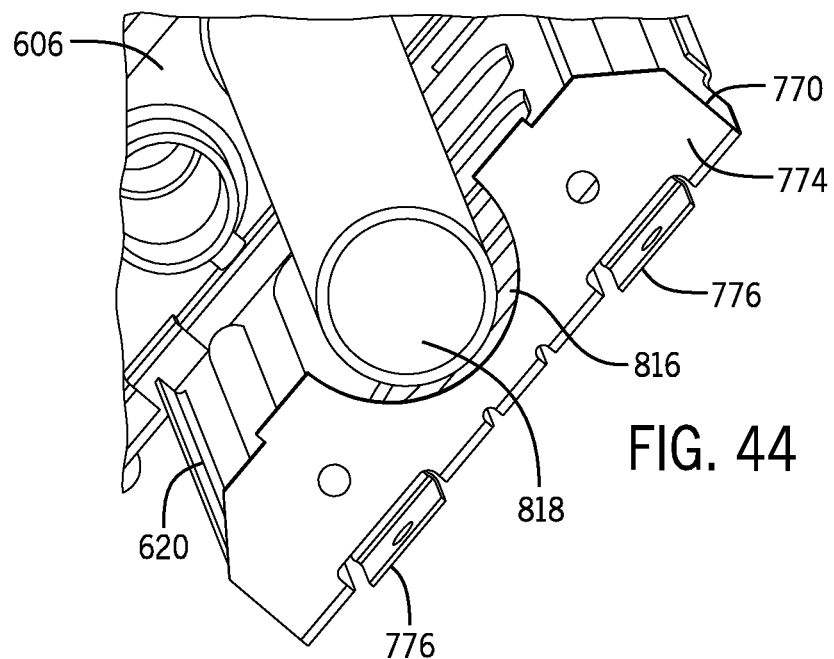
FIG. 44 is a bottom isometric partial view of the box support assembly of FIG. 25.

In some embodiments, the floor stand 620 can include other features. For example, as illustrated in FIG. 44 in particular, the base portion 770 of the floor stand 620 includes a cut-out 816 configured to accommodate passage of a conduit, such as a ½" or a ¾" rigid conduit 818, that extends from an electrical box (e.g., the electrical box 606 (see FIG. 25)). In other arrangements, other sizes of conduit or other components can be similarly accommodated.

Figure 45:
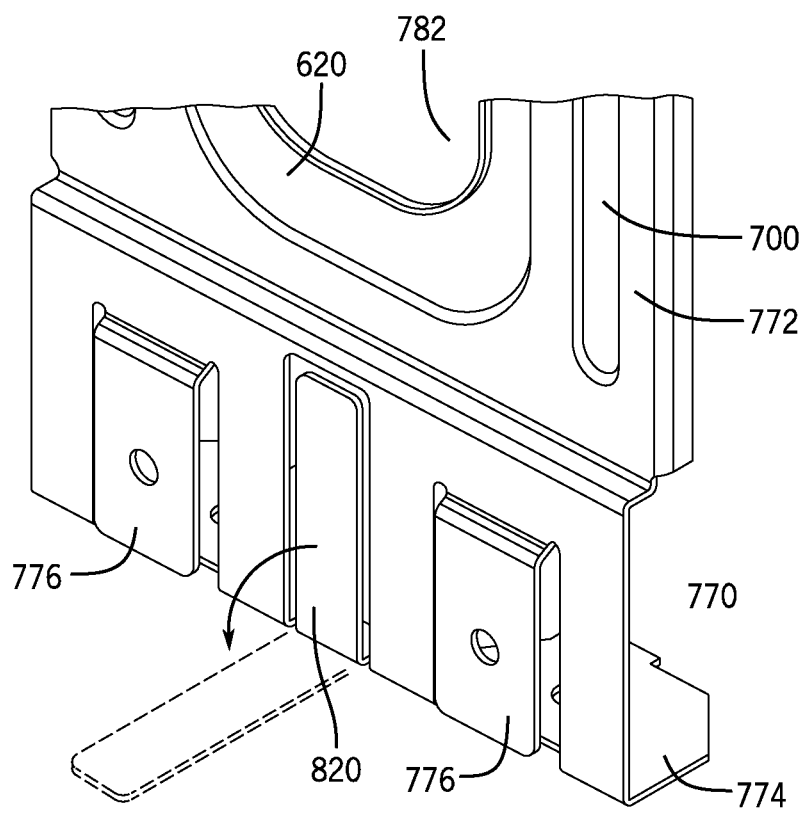
FIG. 45 is an isometric partial view of a bottom portion of the floor stand of FIG. 43.

As another example, as illustrated in FIG. 45 in particular, a finder tab 820 is included between the clasping tabs 776 on the base portion 770 of the floor stand 620. During installation, a user can deform the finder tab 820 to extend perpendicularly to the base portion 770, in order to extend past drywall that is to be installed in front of the floor stand 620. This may be useful, for example, in order to help users to identify the location of the floor stand 620 behind the drywall and, correspondingly, to identify appropriate locations to cut through the drywall to reach electrical boxes supported by the floor stand 620 (e.g., via the box support 602). In some embodiments, the finder tab 820 can be 1.45" long or longer, in order to appropriately extend past installed drywall.

Thus, embodiments of the inventions provide improved support systems for electrical boxes. In some embodiments, for example, mounting interfaces on separate supports can provide for interchangeable, manually installable, nested, and interleaved engagement in order to securely hold the supports together in an integrated assembly. Thus, for example, a support feature and corresponding engagement feature can provide a stable connection between support attachments and the box support. This can be useful, for example, in order to improve the speed, repeatability, and quality of installation of electrical components.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A box support system for supporting one or more electrical boxes, the box support system comprising:
   a box support that includes a first rail, a second rail spaced from the first rail, a receiving area for an electrical box, and a box-support mounting interface defined by at least one of the first rail or the second rail; and
   a support attachment that includes a support-attachment mounting interface to be manually secured to the box-support mounting interface to secure the support attachment to the box support;
   one of the box-support mounting interface or the support-attachment mounting interface being a first mounting interface that includes:
      a first channel defined by a first side wall, a second side wall, and a first connecting wall that extends between the first side wall and the second side wall opposite a first open side of the first channel; and
      a first insertion slot that extends through the first connecting wall; and
   the other of the box-support mounting interface or the support-attachment mounting interface being a second mounting interface that includes:
      a second channel defined by a third side wall, a fourth side wall, and a second connecting wall that extends between the third side wall and the fourth side wall opposite a second open side of the second channel, the second channel being sized to nest within the first channel with the first and second open sides of the first and second channels opposite the first and second connecting walls;
- a first interface arm that extends through the first insertion slot when the second channel is nested within the first channel; and
- a second interface arm that engages an outside surface of an outside of the first channel when the second channel is nested within the first channel, with the first and second interface arms in an interleaved engagement with the first side wall of the first channel.

2. The box support system of claim 1, wherein the first interface arm extends along a plane defined by the third side wall of the second channel; and
   wherein the second interface arm and the third side wall are in an interleaved engagement with the first side wall of the first channel.

3. The box support system of claim 2, wherein the first interface arm is laterally spaced from the second channel.

4. The box support system of claim 1, wherein the first mounting interface includes a second insertion slot that extends through the first connecting wall of the first channel; and
   wherein the second mounting interface includes a third interface arm that extends through the second insertion slot when the second channel is nested within the first channel.

5. The box support system of claim 4, wherein the first and third interface arms extend along a plane defined by the third side wall of the second channel and are spaced apart from the second channel on opposite sides of the second channel.

6. The box support system of claim 5, wherein an entirety of the second connecting wall is received within the first channel when the second channel is nested within the first channel.

7. The box support system of claim 4, wherein a fourth interface arm engages the outside surface of the outside of the first channel when the second channel is nested within the first channel, with the third and fourth interface arms in an interleaved engagement with the first side wall of the first channel.

8. The box support system of claim 7, wherein the second and fourth interface arms are laterally outwardly spaced from the first and third interface arms, respectively, and the second channel.

9. The box support system of claim 1, wherein the third side wall of the second channel includes a locking protrusion that bears against an inside of the first side wall of the first channel when the second channel is nested within the first channel, to retain the second channel within the first channel.

10. The box support system of claim 1, wherein the second interface arm includes a locking protrusion that bears against the outside of the first channel when the second channel is nested within the first channel, to retain the second channel within the first channel.

11. The box support system of claim 1, wherein the first channel has a C-shaped cross-section, defined by the first connecting wall, the first side wall, the second side wall, and the first open side; and
   wherein the second channel has a C-shaped cross-section, defined by the second connecting wall, the third side wall, the fourth side wall, and the second open side.

12. A mounting system for electrical components, the mounting system comprising:
   a first mounting interface that integrally includes:
      a first channel that includes a first side wall, a second side wall, and a first connecting wall that connects the first and second side walls, the first connecting wall opposite a first open side of the first channel; and
      a first insertion slot that is opposite the first open side and extends from inside of the first channel to outside of the first channel; and
   a second mounting interface that integrally includes:
      a second channel that includes a third side wall, a fourth side wall, and a second connecting wall that connects the third and fourth side walls, the second channel sized to be nested within the first channel;
      a first interface arm that extends through the first insertion slot when the second channel is nested within the first channel; and
      a second interface arm that directly engages an outside surface of the second side wall, outside of the first channel, when the second channel is nested within the first channel.

13. The mounting system of claim 12, wherein the second interface arm includes a biased locking protrusion that bears against the first connecting wall of the first channel to secure the second channel nested within the first channel.

14. The mounting system of claim 12, wherein the third side wall of the second channel includes a biased locking protrusion that bears against the second side wall of the first channel to urge the fourth side wall of the second channel toward the first side wall of the first channel when the second channel is nested within the first channel.

15. The mounting system of claim 12, wherein the first interface arm extends along a plane defined by the third side wall of the second channel.

16. A method of securing a first support to a second support for electrical components, the method comprising:
   securing a first mounting interface of the first support that includes a first channel to a second mounting interface of the second support that includes a second channel, including:
      nesting the second channel within the first channel, the first channel being formed from a first side wall, a second side wall, and a first connecting wall that connects the first and second side walls, opposite a first open side of the first channel, the second channel being formed from a third side wall, a fourth side wall, and a second connecting wall that connects the third and fourth side walls, opposite a second open side of the second channel, and nesting the second channel within the first channel including seating the second connecting wall directly on the first connecting wall;
      inserting a first interface arm that extends from the second mounting interface and is laterally spaced from the second channel into a first insertion slot in the first connecting wall of the first mounting interface; and
      engaging a second interface arm extending from the second mounting interface and laterally spaced from the first interface arm with a first outside surface of the second side wall of the first channel,
   wherein nesting the second channel within the first channel biasingly engages a locking protrusion extending from the third side wall of the second channel against the second side wall of the first channel, urging the fourth side wall of the second channel toward the first side wall of the first channel.

17. The method of claim 16, wherein inserting the first interface arm into the first insertion slot aligns the second channel for insertion to be nested within the first channel.

18. The method of claim 16, wherein engaging the second interface arm with the first outside surface of the second side wall of the first channel causes a biased locking tab of the second interface arm to be aligned with a second outside surface of the first connecting wall of the first channel.

* * * * *